(12) United States Patent
Kwon et al.

(10) Patent No.: US 10,205,566 B2
(45) Date of Patent: *Feb. 12, 2019

(54) TRANSMISSION METHOD

(71) Applicant: NEWRACOM, INC., Irvine, CA (US)

(72) Inventors: Yongjin Kwon, Daejeon (KR); Hyungu Park, Daejeon (KR); Ilgu Lee, Daejeon (KR); Minho Cheong, Irvine, CA (US); Hyoungjin Kwon, Daejeon (KR); Jongee Oh, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,267

(22) Filed: Mar. 13, 2018

(65) Prior Publication Data

US 2018/0205510 A1 Jul. 19, 2018

Related U.S. Application Data

(63) Continuation of application No. 15/612,883, filed on Jun. 2, 2017, now Pat. No. 9,954,656, which is a continuation of application No. 14/753,582, filed on Jun. 29, 2015, now Pat. No. 9,698,947.

(60) Provisional application No. 62/025,343, filed on Jul. 16, 2014.

(30) Foreign Application Priority Data

Feb. 10, 2015 (KR) .................. 10-2015-0020341

(51) Int. Cl.
*H04L 5/00* (2006.01)
*H04W 74/08* (2009.01)
*H04W 84/12* (2009.01)

(52) U.S. Cl.
CPC .......... *H04L 5/0007* (2013.01); *H04L 5/0044* (2013.01); *H04L 5/0064* (2013.01); *H04W 74/0816* (2013.01); *H04L 5/001* (2013.01); *H04L 5/0033* (2013.01); *H04W 84/12* (2013.01)

(58) Field of Classification Search
CPC .. H04L 5/0007; H04W 74/0816; H04W 84/12
See application file for complete search history.

(56) References Cited

U.S. PATENT DOCUMENTS 9,954,656 B2 * 4/2018 Kwon .................. H04L 5/0007

* cited by examiner

*Primary Examiner* — Mohammad S Anwar

(57) ABSTRACT

In a WLAN, a device sets a first NAV to a bandwidth used by a signal from a second device. The device selects a channel that does not correspond to the bandwidth from among a plurality of channels when a predetermined condition is satisfied. The predetermined condition includes a condition that the first NAV is set. The device transmits a first frame on the selected channel.

16 Claims, 32 Drawing Sheets

TRANSMISSION METHOD

CROSS-REFERENCE TO RELATED APPLICATION

This application is a continuation of U.S. patent application Ser. No. 15/612,883, filed on Jun. 2, 2017, now U.S. Pat. No. 9,954,656, issued on Apr. 24, 2018, which is a continuation of U.S. patent application Ser. No. 14/753,582, filed on Jun. 29, 2015, now U.S. Pat. No. 9,698,947, issued on Jul. 4, 2017, which claims priority to and the benefit of U.S. Provisional Application No. 62/025,343, filed on Jul. 16, 2014 in the U.S. Patent and Trademark Office and priority to and the benefit of Korean Patent Application No. 10-2015-0020341, filed on Feb. 10, 2015 in the Korean Intellectual Property Office, the entire contents of which are incorporated herein by reference.

BACKGROUND

(a) Field

The described technology relates generally to a transmission method. More particularly, the described technology relates generally to a transmission method in a WLAN.

(b) Description of the Related Art

A frequency band used in the WLAN is an unlicensed band, and other wireless devices, for example Bluetooth devices, besides WLAN devices can use the same frequency band. Therefore, the WLAN devices use a carrier sense multiple access (CSMA) protocol to avoid collisions with the other WLAN devices or the other wireless devices. In the CSMA protocol, the WLAN device detects energy on a channel and transmits the signal only when the channel is not being used. In this case, the WLAN device occupies the channel by transmitting a request to send (RTS) frame or a clear to send (CTS) frame. The other devices set a network allocation vector (NAV) based on a duration field of the RTS frame or CTS frame and do not perform the contention for a channel access during the NAV duration.

A basic service set (BSS) operating on the same channel as a device's BSS and within (either partly or wholly) its basic service area (BSA) may exist in the WLAN. This BSS is called an overlapping basic service set (OBSS). A current WLAN can a wide bandwidth using a primary channel together with a second channel. For example, the IEEE standard 802.11ac may use bandwidths such as 20 MHz, 40 MHz, 80 MHz, and 160 MHz through a secondary channel of 20 MHz, a secondary channel of 40 MHz, and a secondary channel of 80 MHz as well as the primary channel of 20 MHz.

If a device within the BSS sets a NAV by a PPDU [PLCP (physical layer convergence procedure) protocol data unit] from the OBSS, the device cannot use an empty secondary channel due to the NAV set by the OBSS even if the PPDU of the OBSS does not use a part of the secondary channels. Accordingly, there is a problem that the channels cannot be efficiently used.

SUMMARY

An embodiment of the present invention provides a transmitting method for efficiently using channels.

According to another embodiment of the present invention, a transmission method is provided by a first device in a WLAN. The transmission method includes setting a first NAV to a bandwidth used by a signal from a second device, selecting a channel that does not correspond to the bandwidth from among a plurality of channels when a predetermined condition is satisfied, the predetermined condition including a condition that the first NAV is set, and transmitting a first frame on the selected channel.

The signal from the second device may include a signal from an OBSS of the first device.

The first NAV may be set to only the bandwidth used by the signal among the plurality of channels.

The predetermined condition may further include a condition that a second NAV is set by a basic service set (BSS) of the first device.

The first frame may be a response frame on an initiate frame from a third device.

The initiate frame may include an indication indicating that the plurality of channels are independently used.

The initiate frame may include an indication indicating that an OFDMA transmission is supported.

The plurality of channels may include a primary channel and a plurality of secondary channels, and the selected channel may include a secondary channel that does not correspond to the bandwidth among the plurality of secondary channels.

The transmission method may further include receiving a second frame on a same channel as the selected channel after transmitting the first frame.

The predetermined condition may further include that a time when a transmission through the selected channel is completed is earlier than a time when the first NAV expires.

Transmitting the first frame may includes, while a first modem is being operated for the bandwidth in a multi-modem, additionally operating a second modem in the multi-modem, and transmitting the first frame on the selected channel through the second modem.

The transmission method may further include terminating an operation of the second modem after a transmission through the selected channel is completed.

According to yet another embodiment of the present invention, a transmission method is provided by a first device in a WLAN. The transmission method includes transmitting a first frame to a second device that sets a first network allocation vector (NAV) to a bandwidth used by a signal from a third device and receiving a second frame through a first channel that does not correspond to the bandwidth among a plurality of channels, in response to the first frame.

The first frame may include an indication indicating that the plurality of channels are independently used.

The first frame may include an OFDMA transmission is supported.

The plurality of channels may include a primary channel and a plurality of secondary channels, and the first channel may include a secondary channel that does not correspond to the bandwidth among the plurality of secondary channels.

The transmission method may further include transmitting a third frame to the second device on a same channel as the first channel.

The transmission method may further include transmitting, through a second channel among the plurality of channels, a NAV setting value for setting a NAV to the second channel when transmitting the third frame.

The NAV setting value may indicate duration that is needed to complete a transmission through the first channel.

The transmission method may further include transmitting a fourth frame through a second channel among the plurality of channels.

The fourth frame may include a duration field indicating predetermined duration.

The predetermined duration may include duration that is needed to complete a transmission through the first channel.

The transmission method may further include transmitting a fourth frame for setting a NAV to the first channel before transmitting the third frame.

Transmitting the first frame may include transmitting the first frame through a first modem in a multi-modem, and receiving the second frame may include additionally operating a second modem in the multi-modem.

The transmission method may further include terminating an operation of the second modem after a transmission through the first channel is completed.

According to still embodiment of the present invention, a transmission apparatus of a first device is provided in a WLAN. The transmission apparatus includes a processor and a transceiver. The processor sets a first NAV to a bandwidth used by a signal from a second device, and selects a channel that does not correspond to the bandwidth from among a plurality of channels when a predetermined condition is satisfied, the predetermined condition including a condition that the first NAV is set. The transceiver transmits a first frame on the selected channel.

According to further embodiment of the present invention, a transmission apparatus of a first device is provided in a WLAN. The transmission apparatus includes a processor and a transceiver. The processor generates a first frame. The transceiver transmits the first frame to a second device that sets a first NAV to a bandwidth used by a signal from a third device and receives a second frame through a first channel that does not correspond to the bandwidth among a plurality of channels, in response to the first frame.

DETAILED DESCRIPTION OF THE EMBODIMENTS

Figure 1:
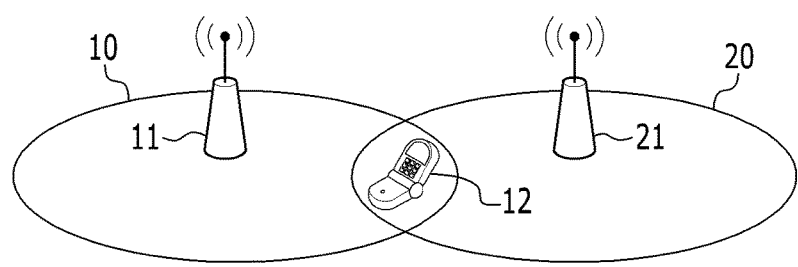
FIG. 1 shows an example of a wireless communication network according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A WLAN standard defines a data frame, a control frame, and a management frame as frames exchanged between devices. The data frame is used for transmission of data forwarded to a higher layer, and a WLAN device transmits the data frame after performing backoff if an interframe space (IFS) has elapsed. The management frame is used for exchanging management information which is not forwarded to the higher layer, and the WLAN device transmits the management frame after performing backoff if the IFS such as a distributed coordination function interframe space (DIFS) or a point coordination function interframe space (PIFS) has elapsed. The control frame is used for controlling access to the medium. When the control frame is not a response frame of the other frame, the WLAN device transmits the control frame after performing backoff if the IFS has elapsed. When the control frame is the response frame of the other frame, the WLAN device transmits the control frame without performing backoff if a short IFS (SIFS) has elapsed.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices includes a WLAN device that is an access point and a WLAN device that is a non-AP station (non-AP STA). Alternatively, all the plurality of WLAN devices may be non-AP STAs in Ad-hoc networking. In general, the AP STA and the non-AP STA may be collectively called the STA. However, for easy description, only the non-AP STA may be called the STA.

Now, a transmission method and a transmission apparatus according to an embodiment of the present invention will be described with reference to the drawings in detail.

Figure 2:
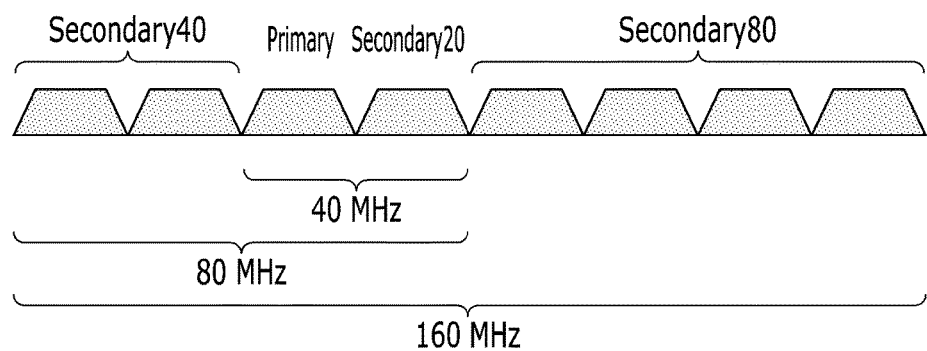
FIG. 2 shows an example of a channel bandwidth used in a wireless communication network according to an embodiment of the present invention.
Figure 3:
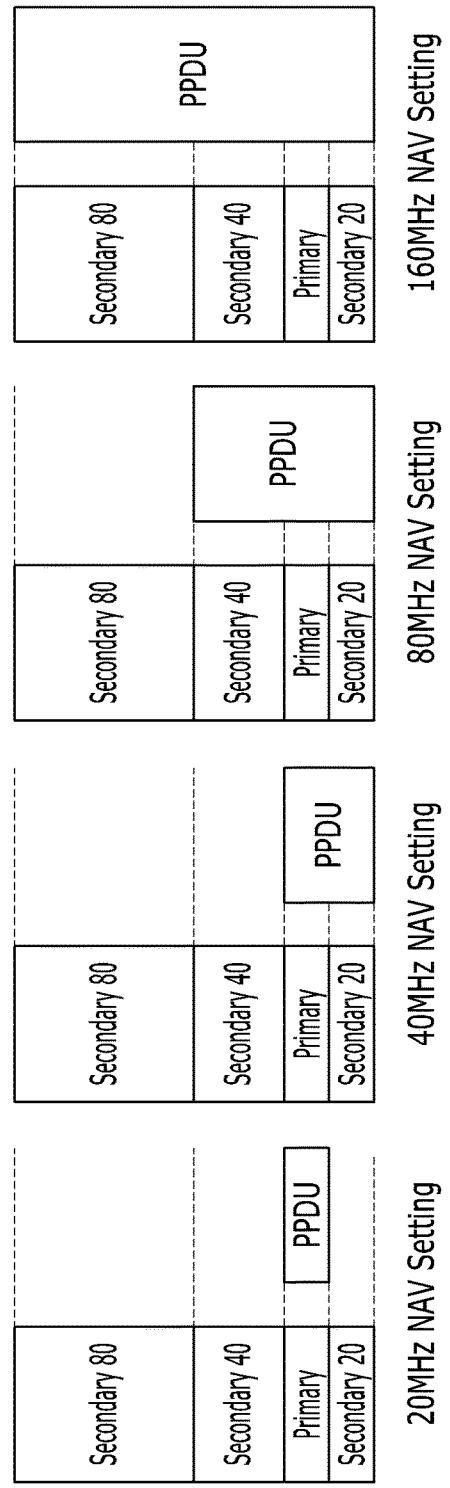
FIG. 3 shows an example of a bandwidth dependent NAV used in a wireless communication network according to an embodiment of the present invention.

FIG. 1 shows an example of a wireless communication network according to an embodiment of the present invention, FIG. 2 shows an example of a channel bandwidth used in a wireless communication network according to an embodiment of the present invention, and FIG. 3 shows an example of a bandwidth dependent NAV used in a wireless communication network according to an embodiment of the present invention.

Referring to FIG. 1, a BSS 10 includes a plurality of WLAN devices. The plurality of WLAN devices includes a device that is an access point (AP) 11 and a device that is a non-AP station (non-AP STA), i.e., a STA 12.

The AP 11 and the STA 12 support a wireless communication network according to an embodiment of the present invention. For example, the wireless communication network according to an embodiment of the present invention may be a high efficiency WLAN (HEW) that is being developed by the IEEE 802.11ax task group. Hereinafter, the wireless communication network according to an embodiment of the present invention is assumed as the HEW for convenience.

The BSS 10 may further include a previous version device. The previous version device may include, for example, a device (hereinafter referred to as a "legacy device") supporting IEEE standard 802.11a or 802.11g (IEEE Std 802.11a-1999 or IEEE Std 802.11g-2003), a device (hereinafter referred to as an "HT device") supporting IEEE standard 802.11n (IEEE Std 802.11n-2009) for enhancements for higher throughput (HT), or a device (hereinafter referred to as a "VHT device") supporting IEEE standard 802.11ac (IEEE Std 802.11ac-2013) for enhancements for very high throughput (VHT).

The STA 12 is included in the service coverage of an overlapping basic service set (OBSS) 20. The OBSS 20 includes a plurality of devices, and the plurality of devices includes a device that is an AP 21. Accordingly, the STA 12 may set a NAV by the OBSS 20. The AP 21 may be a HEW AP or a previous version AP.

A channel used in a HEW that is an example of a wireless communication network according to an embodiment of the present invention may be divided into a primary channel and a plurality of secondary channels. For example, when a 160 MHz channel width is used in the wireless communication network, the 160 MHz channel width may be divided into a primary channel (primary) having a 20 MHz bandwidth (hereinafter referred to as a "primary 20 MHz channel"), a secondary channel (secondary20) having a 20 MHz bandwidth (hereinafter referred to as a "secondary 20 MHz channel"), a secondary channel (secondary40) having a 40 MHz bandwidth (hereinafter referred to as a "secondary 40 MHz channel"), and a secondary channel (secondary80) having a 80 MHz bandwidth (hereinafter referred to as a "secondary 80 MHz channel").

A VHT device uses the primary 20 MHz channel for a transmission of the 20 MHz bandwidth, the primary 20 MHz channel and the secondary 20 MHz channel for a transmission of the 40 MHz bandwidth, the primary 20 MHz channel, the secondary 20 MHz channel and the secondary 40 MHz channel for a transmission of the 80 MHz bandwidth, and the primary 20 MHz channel, the secondary 20 MHz channel, the secondary 40 MHz channel and the secondary 80 MHz channel for a transmission of the 160 MHz bandwidth. As such, the VHT device may always use the other secondary channel together with the primary 20 MHz channel.

However, a HEW device according to an embodiment of the present invention can use the secondary channel independently from the primary channel. For the independent use of the secondary channel, for example an orthogonal frequency division multiple access (OFDMA) scheme may be used.

In this case, the HEW device sets a bandwidth dependent NAV when setting a NAV in accordance with channel occupation in an OBSS using the same channel as its BSS, i.e., a signal from a device of the OBSS. In some embodiments, the HEW device may set the bandwidth dependent NAV even when setting the NAV in accordance with channel occupation in its BSS.

Referring to FIG. 3, when receiving a signal through a primary 20 MHz channel, for example a 20 MHz PPDU [PLCP (physical layer convergence procedure) protocol data unit] from the OBSS, the HEW device sets a 20 MHz NAV on a bandwidth of the primary 20 MHz channel. In this case, the HEW device does not set the bandwidth dependent NAV on other bandwidths, i.e., bandwidths of a secondary 20 MHz channel, a secondary 40 MHz channel, and a secondary 80 MHz channel.

When receiving a 40 MHz PPDU from the OBSS, the HEW device sets a 40 MHz NAV on the bandwidths of the primary 20 MHz channel and the secondary 20 MHz channel. In this case, the HEW device does not set the bandwidth dependent NAV on other bandwidths, i.e., the bandwidths of the secondary 40 MHz channel and the secondary 80 MHz channel.

When receiving an 80 MHz PPDU from the OBSS, the HEW device sets an 80 MHz NAV on the bandwidths of the primary 20 MHz channel, the secondary 20 MHz channel, and the secondary 40 MHz channel. In this case, the HEW device does not set the bandwidth dependent NAV on other bandwidth, i.e., the bandwidth of the secondary 80 MHz channel.

When receiving a 160 MHz PPDU from the OBSS, the HEW device sets a 160 MHz NAV on the bandwidths of the primary 20 MHz channel, the secondary 20 MHz channel, the secondary 40 MHz channel, and the secondary 80 MHz channel.

In another embodiment, the HEW device may set a new NAV (hereinafter referred to as a "BSS NAV") that is different from a NAV (hereinafter referred to as a "conventional NAV") of the previous version WLAN when receiving a PPDU from its BSS.

Accordingly, if the BSS NAV is reset (i.e., the BSS NAV counts down to 0), the HEW device can use a bandwidth other than the bandwidth to which the NAV is set by the bandwidth dependent NAV even if the bandwidth dependent NAV is set by the OBSS. For example, when the 40 MHz NAV is set by the OBSS, the HEW device can use the secondary 40 MHz channel or the secondary 80 MHz channel if the BSS NAV is reset.

In yet another embodiment, the HEW device may set the conventional NAV for the backward compatibility with the previous version WLAN when setting the bandwidth dependent NAV and the BSS NAV. That is, the HEW device may set the conventional NAV when setting the BSS NAV based on the PPDU transmitted from its BSS, and may set the conventional NAV when setting the bandwidth dependent NAV based on the PPDU transmitted from the OBSS.

Hereinafter, a transmission method using a bandwidth dependent NAV according to various embodiments of the present invention is described with reference to FIG. 4, FIG. 5, FIG. 6, FIG. 7, FIG. 8, FIG. 9, FIG. 10, FIG. 11, and FIG. 12.

Figure 4:
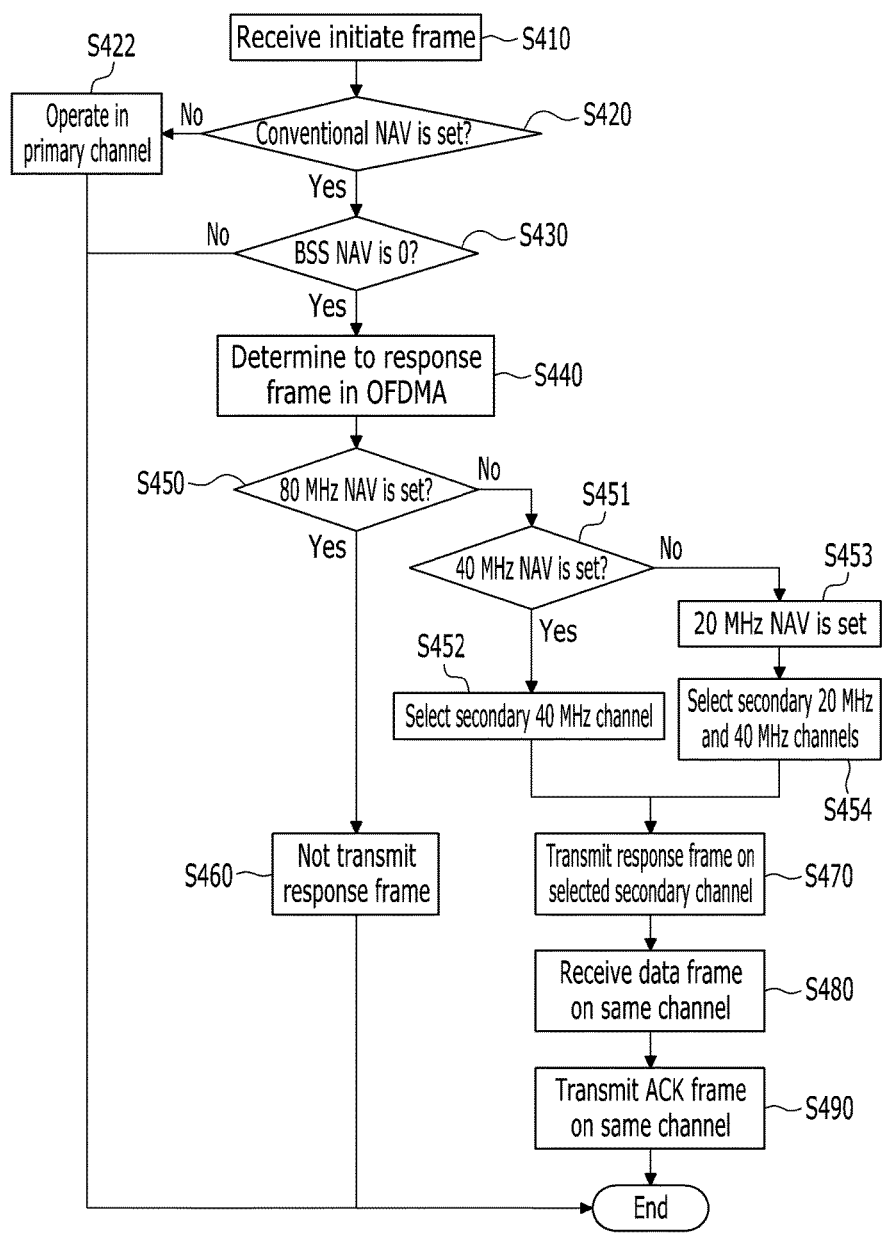
FIG. 4 is a flowchart exemplifying a transmission method in a wireless communication according to an embodiment of the present invention.

FIG. 4 is a flowchart exemplifying a transmission method in a wireless communication according to an embodiment of the present invention, FIG. 5, FIG. 6, FIG. 7, and FIG. 8 each show an operation example of a device under a bandwidth dependent NAV in a wireless communication according to an embodiment of the present invention, and FIG. 9, FIG. 10, FIG. 11, and FIG. 12 each are a flowchart exemplifying a transmission method in a wireless communication according to various embodiments of the present invention.

It is assumed in FIG. 4 to FIG. 8 for convenience that an 80 MHz channel width is used in a HEW device's BSS and an OBSS uses the same channel as the BSS. That is, it is assumed that the 80 MHz channel width including a primary 20 MHz channel, a secondary 20 MHz channel, and a secondary 40 MHz channel is used in a channel width shown in FIG. 2 and FIG. 3. Further, a WLAN environment where a bandwidth dependent NAV, a BSS NAV, and a conventional NAV are used is assumed in FIG. 4 to FIG. 8.

Referring to FIG. 4, a transmitting HEW device transmits an initiate frame for initiating a transmission to a receiving HEW device (S410). The initiate frame is a control frame and may be for example an RTS frame. The HEW device receiving the initiate frame determines whether the conventional NAV is set (S420). If the conventional NAV is not set (S420: No), the receiving HEW device operates on the primary channel since the primary channel is not occupied (S422). That is, the receiving HEW device transmits a response frame to the transmitting HEW device on the primary channel. The response frame on the initiate frame is a control frame and may be for example a CTS frame.

If the conventional NAV has been set (S420: Yes), the receiving HEW device determines whether the BSS NAV is not set, i.e., the counter of the BSS NAV is 0 (S430) since the primary channel is occupied by the BSS or the OBSS. If the BSS NAV is set (S430: No), the receiving HEW device stands by since a frame is transmitted from its BSS.

If the BSS NAV is not set (S430: Yes), the receiving HEW device determines to transmit the response frame by using a secondary channel since the conventional NAV is set by the OBSS (S440). For example, the receiving HEW device may determine to transmit the response frame by using an OFDMA transmission. Accordingly, the receiving HEW device checks a bandwidth dependent NAV that is set together with the conventional NAV. That is, the HEW device determines whether an 80 MHz NAV is set (S450). If the 80 MHz NAV is set (S450: Yes), the receiving HEW device does not transmit the response frame and stands by (S460) since there is no bandwidth that is not occupied by the OBSS. If the 80 MHz NAV is not set (S450: No), the receiving HEW device determines whether a 40 MHz NAV is set (S451). If the 40 MHz NAV is set (S451: Yes), the receiving HEW device selects a secondary 40 MHz channel that is not occupied by the OBSS (S452). If the 40 MHz NAV is not set (S451: No), the receiving HEW device determines that a 20 MHz NAV is set (S453), and selects a secondary 20 MHz channel and the secondary 40 MHz channel that are not occupied by the OBSS (S454). In some embodiments, the receiving HEW device may select any one secondary channel of the secondary 20 MHz channel and the secondary 40 MHz channel. While it has been shown in FIG. 4 that determining whether the bandwidth dependent NAV is set is performed in an order of the 80 MHz NAV, the 40 MHz NAV, and the 20 MHz NAV, determining whether the bandwidth dependent NAV is set may be performed in a different order or at the same time.

Next, the receiving HEW device transmits the response frame to the transmitting HEW device through the selected secondary channel (S470). Accordingly, the transmitting HEW device transmits a data frame to the receiving HEW device through the secondary channel that is selected by the receiving HEW device (S480), and the receiving HEW device transmits an acknowledgement (ACK) frame to the transmitting HEW device through the same channel (S490). In some embodiments, when the receiving HEW device selects a plurality of secondary channels, for example the secondary 20 MHz channel and the secondary 40 MHz channel, the transmitting HEW device may select a second channel from among the plurality of secondary channels and transmit the data frame through the selected channel. In this case, the transmitting HEW device may select one second channel. Alternatively, the transmitting HEW device may select two or more second channels.

Figure 5:
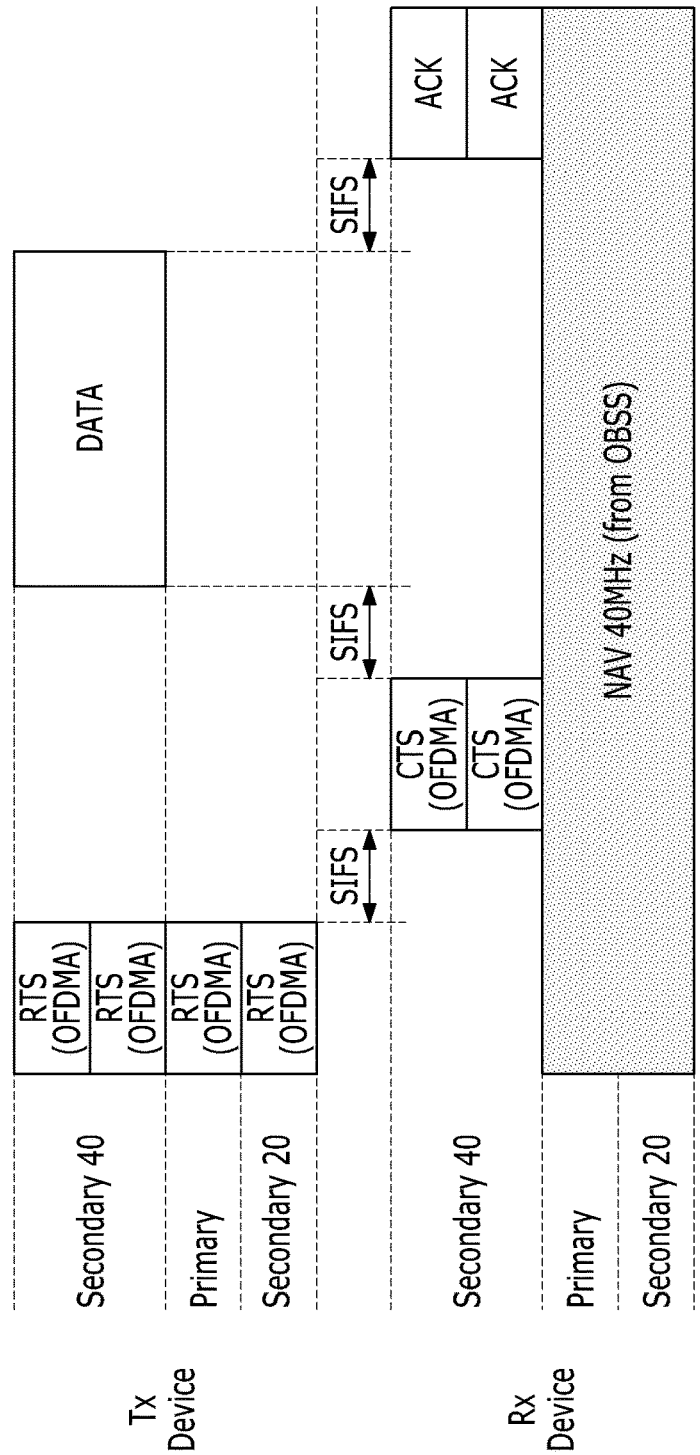
FIG. 5, FIG. 6, FIG. 7, and FIG. 8 each show an operation example of a device under a bandwidth dependent NAV in a wireless communication according to an embodiment of the present invention.

Referring to an example shown in FIG. 5, when a receiving HEW device receives an RTS frame from a transmitting HEW device, the receiving HEW device determines to transmit a CTS frame by using an OFDMA transmission since a conventional NAV is set by an OBSS. Further, because a 40 MHz NAV is set, the receiving HEW device transmits the CTS frame through a secondary 40 MHz channel, and the transmitting HEW device transmits a data frame through the secondary 40 MHz channel. Since the CTS frame, the data frame and the ACK frame are response frames on the RTS frame, the CTS frame, and the data frame, respectively, they may be transmitted without backoff after an SIFS interval has elapsed.

Figure 6:
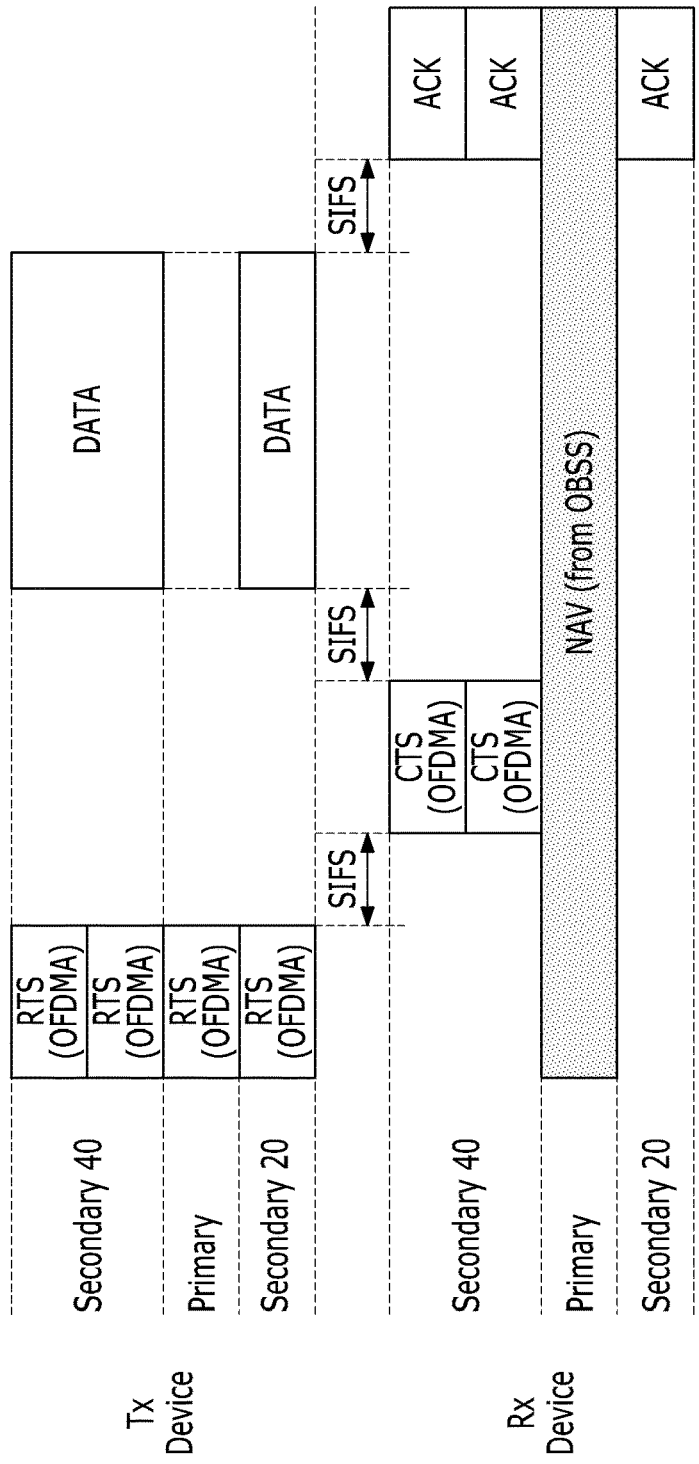

Referring to an example shown in FIG. 6, when a receiving HEW device receives an RTS frame from a transmitting HEW device, the receiving HEW device determines to transmit a CTS frame by using an OFDMA transmission since a conventional NAV is set by an OBSS. Further, because a 20 MHz NAV is set, the receiving HEW device transmits the CTS frame through a secondary 20 MHz channel and a secondary 40 MHz channel, and the transmitting HEW device transmits a data frame through the secondary 20 MHz channel and the secondary 40 MHz channel.

Figure 7:
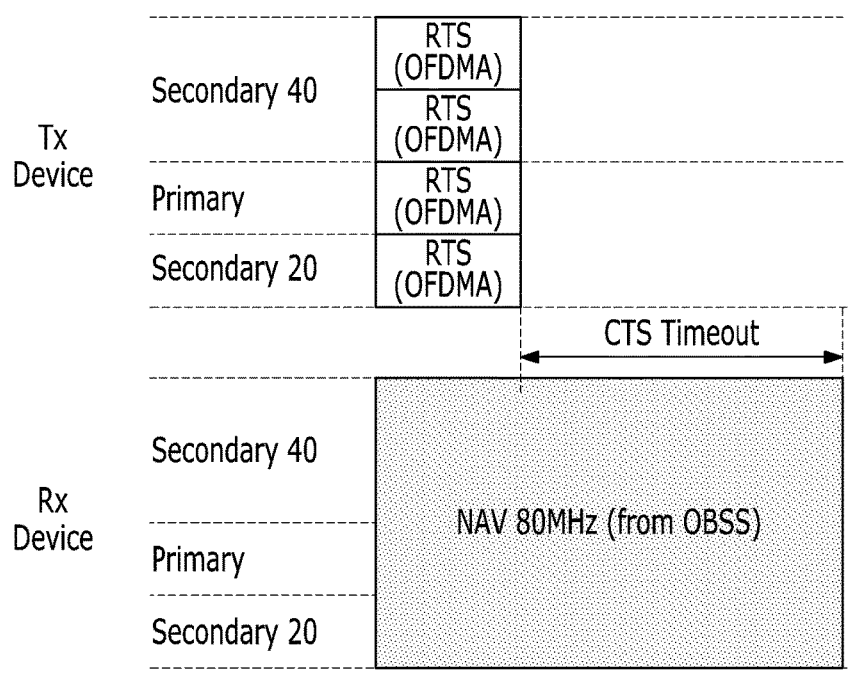

Referring to an example shown in FIG. 7, when a receiving HEW device receives an RTS frame from a transmitting HEW device, the receiving HEW device determines to transmit a CTS frame by using an OFDMA transmission since a conventional NAV is set by an OBSS. However, because an 80 MHz NAV is set, the receiving HEW device does not transmit the CTS frame and stands by since there is no secondary channel to be selected. Then, a CTS timer expires.

Figure 8:
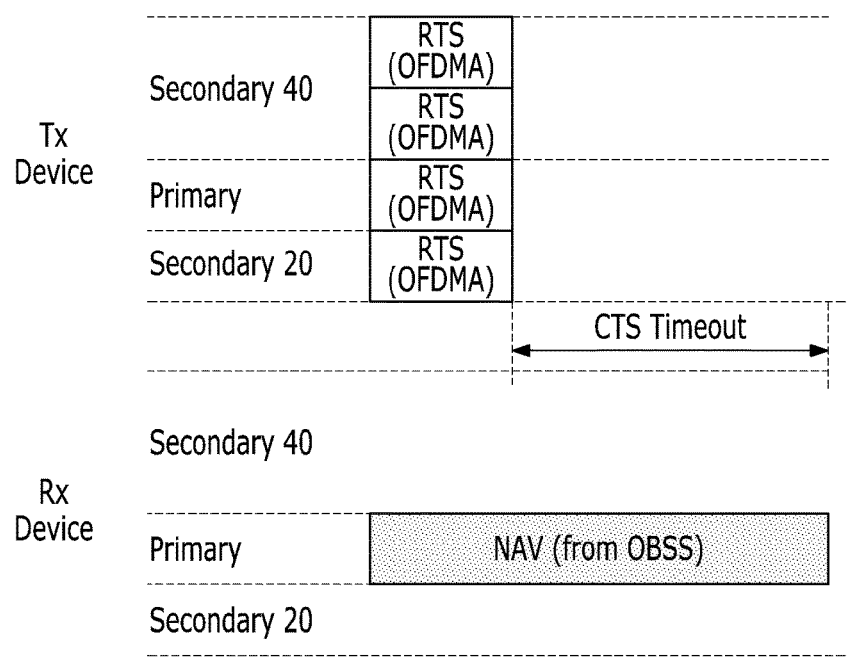

Referring to an example shown in FIG. 8, a receiving HEW device receives an RTS frame from a transmitting HEW device, the receiving HEW device does not transmit a CTS frame and stands by since a conventional NAV is set by its BSS, i.e., a BSS NAV is set. Then, a CTS timer expires.

Figure 9:
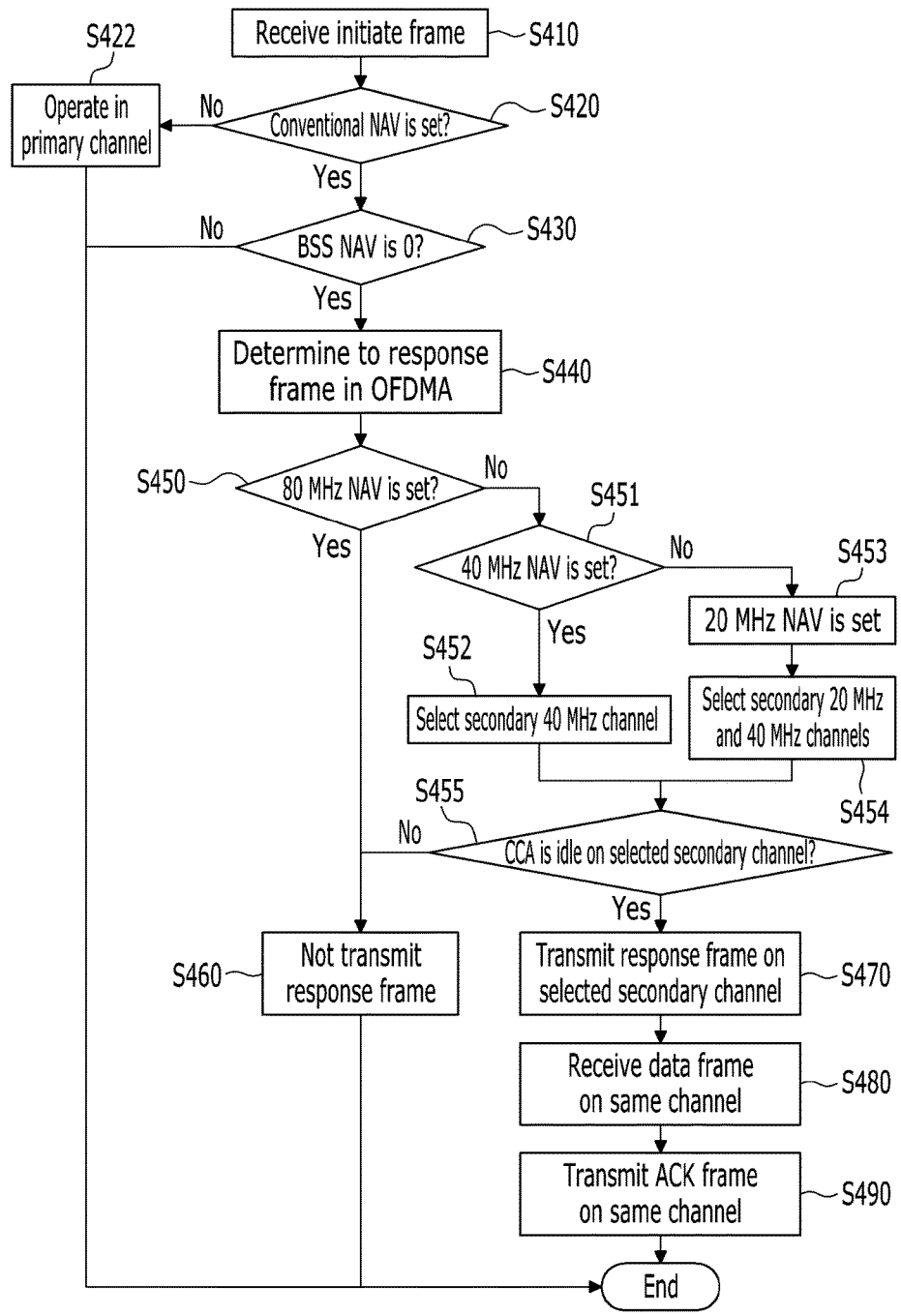
FIG. 9, FIG. 10, FIG. 11, and FIG. 12 each are a flowchart exemplifying a transmission method in a wireless communication according to various embodiments of the present invention.

In some embodiments, the receiving HEW device may perform a clear channel assessment (CCA) for the selected secondary channel and transmit the CTS frame when the CCA is idle. In one example, as shown in FIG. 9, before transmitting the CTS frame, the receiving HEW device may determine whether the CCA on the selected secondary channel has been idle during a point coordination function IFS (PIFS) interval before the RTS frame starts (S455). If the CCA on the selected secondary channel has been idle during the PIFS interval (S455: Yes), the receiving HEW device transmits the CTS frame (S470). If the CCA on the selected secondary channel has not been idle during the PIFS interval (S455: No), the receiving HEW device does not transmit the CTS frame and stands by.

Figure 10:
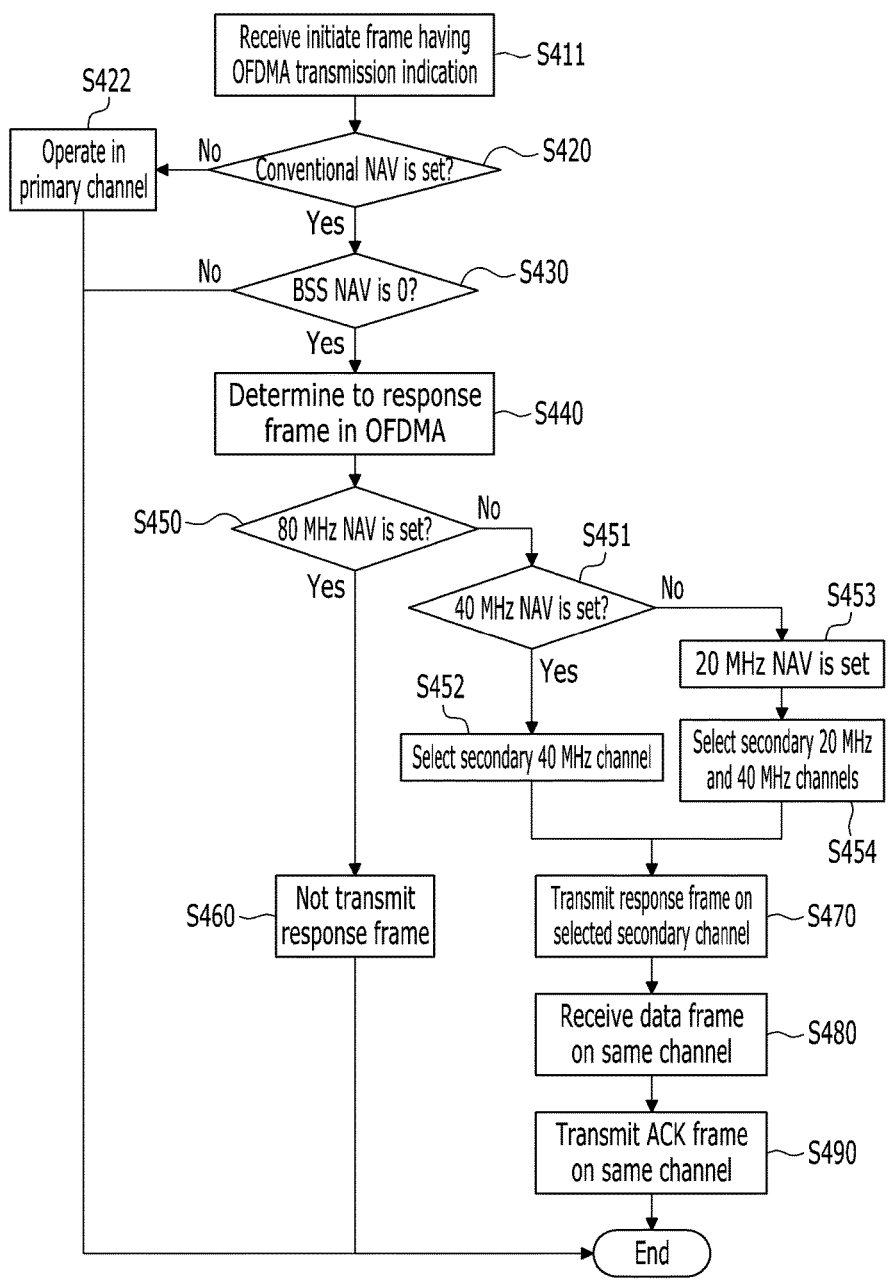

In some embodiments, the receiving HEW device may determine whether the transmitting HEW device transmits the secondary channel independently, through the initiate frame, for example the RTS frame, transmitted by the transmitting HEW device. In this case, as shown in FIG. 10, the receiving HEW device may perform the procedures S420 to S490 described with reference to FIG. 4 or FIG. 9 after checking whether the initiate frame transmitted by the transmitting HEW device includes an indication indicating whether the transmitting HEW device supports the independent transmission of the secondary channel, for example the OFDMA transmission (S411).

Figure 11:
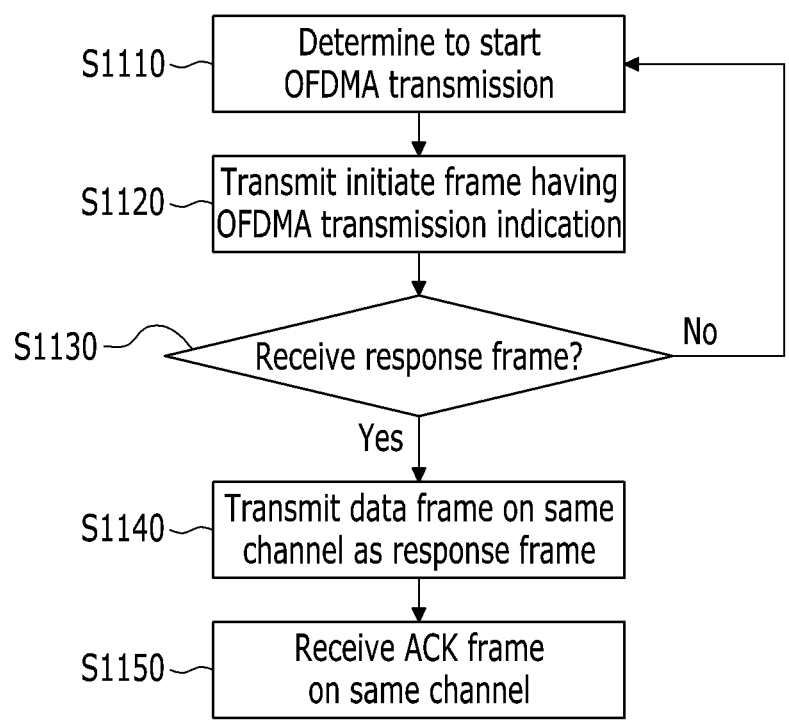

To this end, as shown in FIG. 11, if the transmitting HEW device determines to start the OFDMA transmission (S1110), the transmitting HEW device adds to an initiate frame an indication indicating that the OFDMA transmission is supported and transmits the initiate frame including the indication (S1120). Accordingly, as described with reference to FIG. 4 to FIG. 10, the receiving HEW device can select a secondary channel and transmit a response frame, for example a CTS frame.

Upon receiving the response frame from the receiving HEW device (S1130), the transmitting HEW device transmits a data frame to the receiving HEW device through the same channel as the response frame (S1140). The transmitting HEW device receives an ACK frame from the receiving HEW device through the same channel (S1150) when the receiving HEW device has successfully received the data frame.

Figure 12:
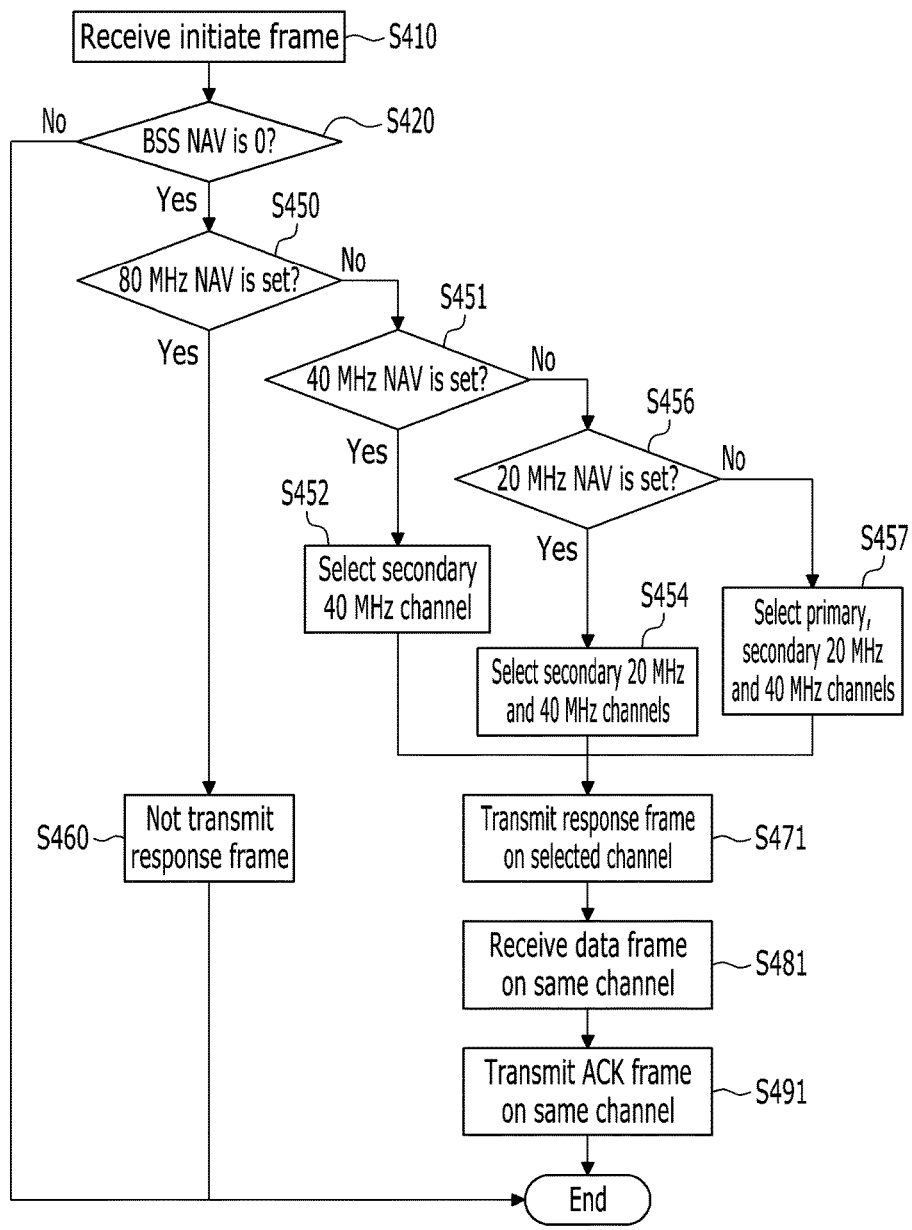

In some embodiments, the conventional NAV may be not used and the bandwidth dependent NAV and the BSS NAV may be used in the WLAN environment. In this case, as shown in FIG. 12, when the BSS NAV counter is 0, the receiving HEW device may perform the procedure for selecting the secondary channel by checking the bandwidth dependent NAV without checking the conventional NAV (S430). That is, the receiving HEW device checks whether the 80 MHz NAV, the 40 MHz NAV, or the 20 MHz NAV is set and selects a channel according to the checking result. Particularly, when all of the 80 MHz NAV, the 40 MHz NAV, and the 20 MHz NAV are not set (S456), the receiving HEW device may select all of the primary channel, the secondary 20 MHz channel, and the secondary 40 MHz channel (S457). In another embodiment, the receiving HEW device may select a channel from among a plurality of selectable channels. In this case, the receiving HEW device may select one channel. Alternatively, the receiving HEW device may select two or more channels. In yet another embodiment, when the primary channel is selectable, the receiving HEW device may always select the primary channel.

The receiving HEW device transmits the response frame on the selected channel (S471), and receives the data frame from the transmitting HEW device on the selected channel (S481). In another embodiment, if the receiving HEW device selects a plurality of channels, the transmitting HEW device may select a channel from among the plurality of channels and transmit the data frame on the selected channel. In this case, the transmitting HEW device may select one channel. Alternatively, the transmitting HEW device may select two or more channels. The receiving HEW device transmits the ACK frame to the transmitting HEW device on the same channel as the data frame (S491).

As such, according to embodiments of the present invention, even if the NAV is set by the OBSS, the frame can be transmitted on the secondary channel that is not occupied by the OBSS differently from the previous WLAN. As a result, the channels can be efficiently used.

As described above, while the transmitting HEW device and the receiving HEW device are communicating with each other through the secondary channel, the conventional NAV of the other device may expire. In this case, the other device whose NAV has expired may attempt a transmission on the primary channel.

Hereinafter, embodiments for protecting the primary channel from the other device are described with reference to FIG. 13 to FIG. 19.

Figure 13:
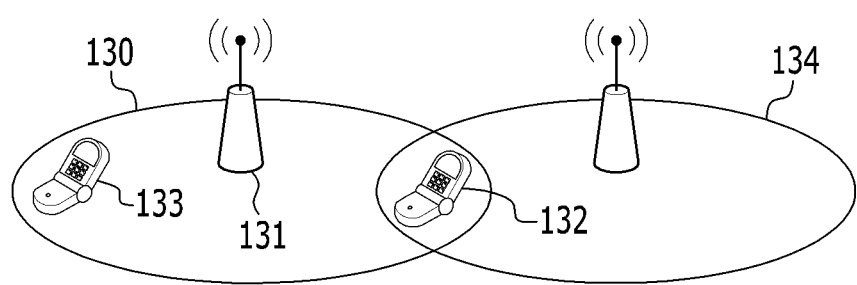
FIG. 13 shows an example of a wireless communication network in which a hidden device exists.
Figure 14:
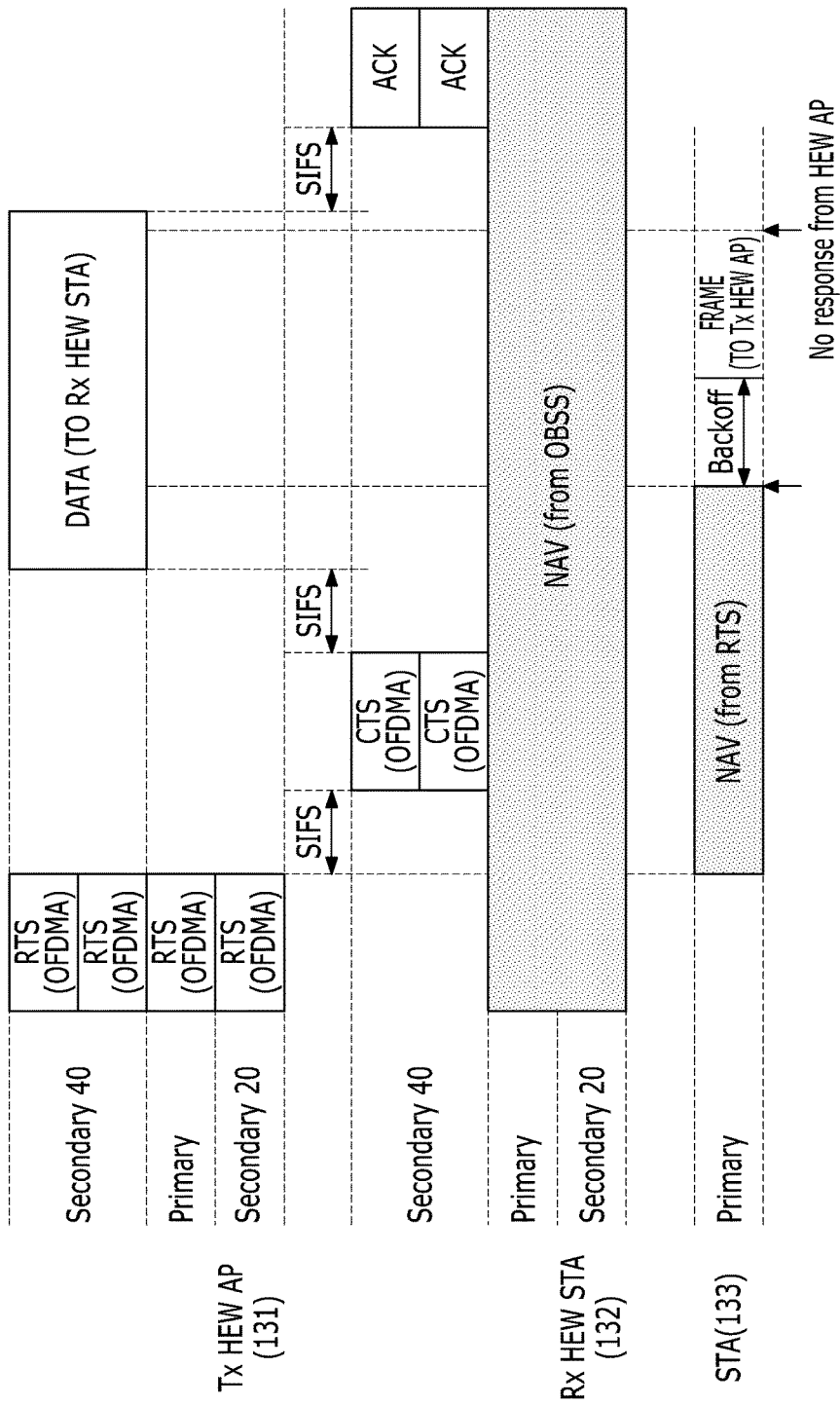
FIG. 14 shows an operation example of a hidden device in a wireless communication network shown in FIG. 13.

FIG. 13 shows an example of a wireless communication network in which a hidden device exists, and FIG. 14 shows an operation example of a hidden device in a wireless communication network shown in FIG. 13.

Referring to FIG. 13 and FIG. 14, in a case that a 40 MHz NAV is set by an OBSS 134 of a BSS 130 to which a HEW STA 132 belongs, the HEW STA 132, i.e., a receiving HEW device may transmit a CTS frame to a HEW AP 131, i.e., a transmitting HEW device on a secondary 40 MHz channel, and the HEW AP 131 may transmit a downlink data frame to the HEW STA 132 on the secondary 40 MHz channel. Other STA 133 that is hidden from the HEW STA 132 may exist within the BSS 130. The other STA 133 may be a previous version device that is not a HEW device. Then, the other STA 133 may set a conventional NAV from an RTS frame transmitted by the HEW AP 131, but cannot set the conventional NAV from a CTS frame since it is the STA hidden from the HEW STA 132. If a NAV setting value included in the RTS frame is set to duration necessary for transmitting a data frame at the time of using an 80 MHz bandwidth, the NAV set from the RTS frame may be shorter than duration necessary for transmitting the data frame at the time of using a channel of some bandwidth (for example, a secondary 40 MHz channel). Accordingly, while the HEW AP 131 is transmitting the data frame to the HEW STA 132, a NAV counter of the STA 133 may become zero. In this case, since the primary channel within the BSS 130 has not been occupied yet, the STA 133 may transmit a frame to the HEW AP 131 on the primary channel after the backoff. However, since the HEW AP 131 is transmitting the data frame to the HEW STA 132, the HEW AP 131 may not transmit a response frame on the frame transmitted from the STA 133.

To solve this scenario, the transmitting HEW device may protect the primary channel to prevent the other device from transmitting the frame on the primary channel. These embodiments are described with reference to FIG. 15 to FIG. 19.

Figure 15:
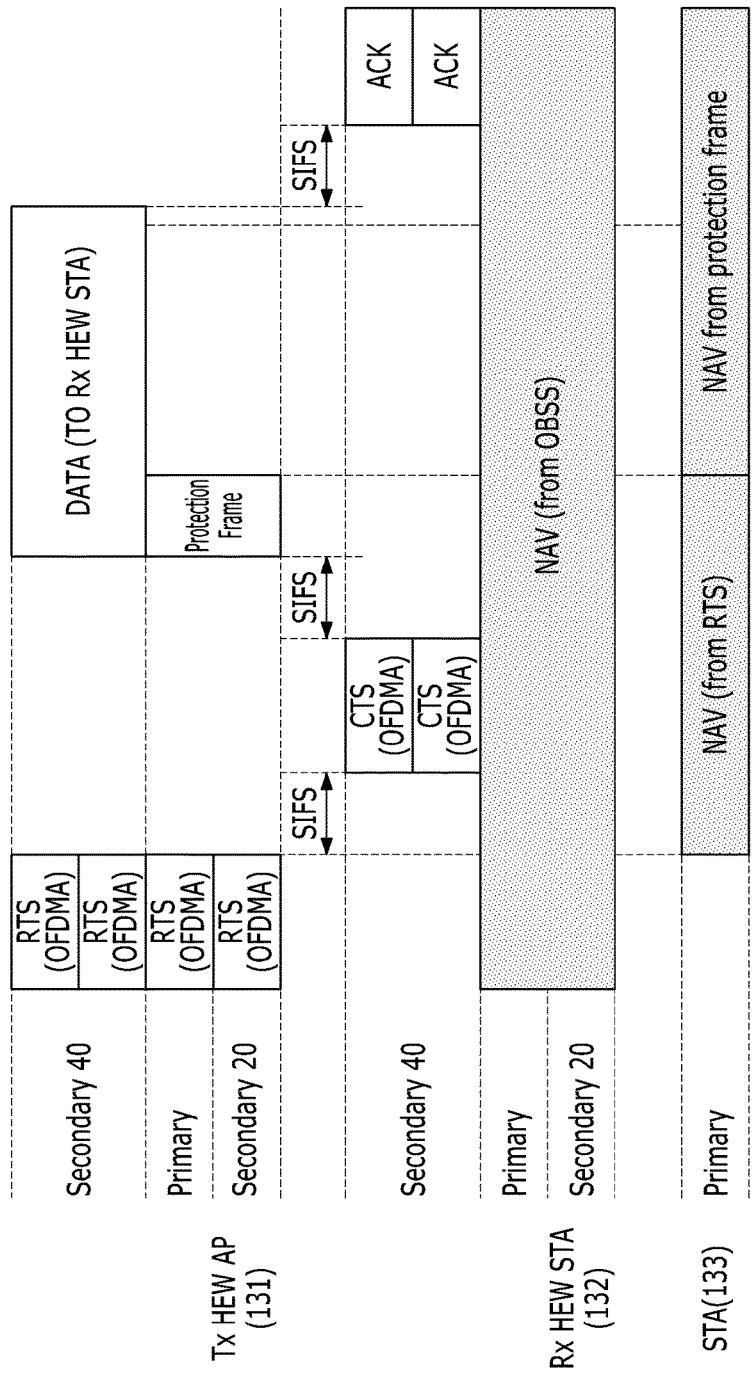
FIG. 15, FIG. 16, and FIG. 19 each show a primary channel protecting method in a wireless communication network according to various embodiments of the present invention.
Figure 16:
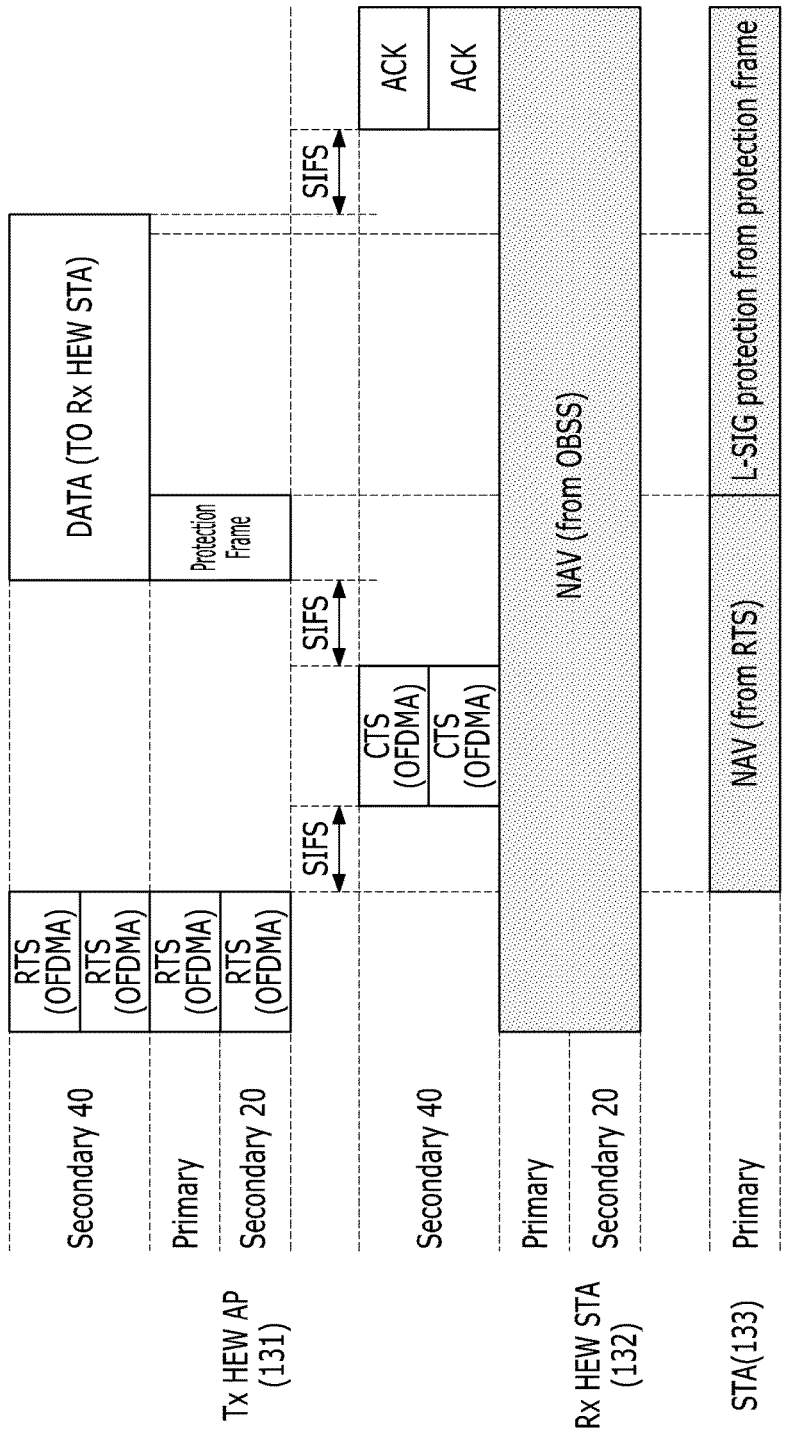
Figure 17:
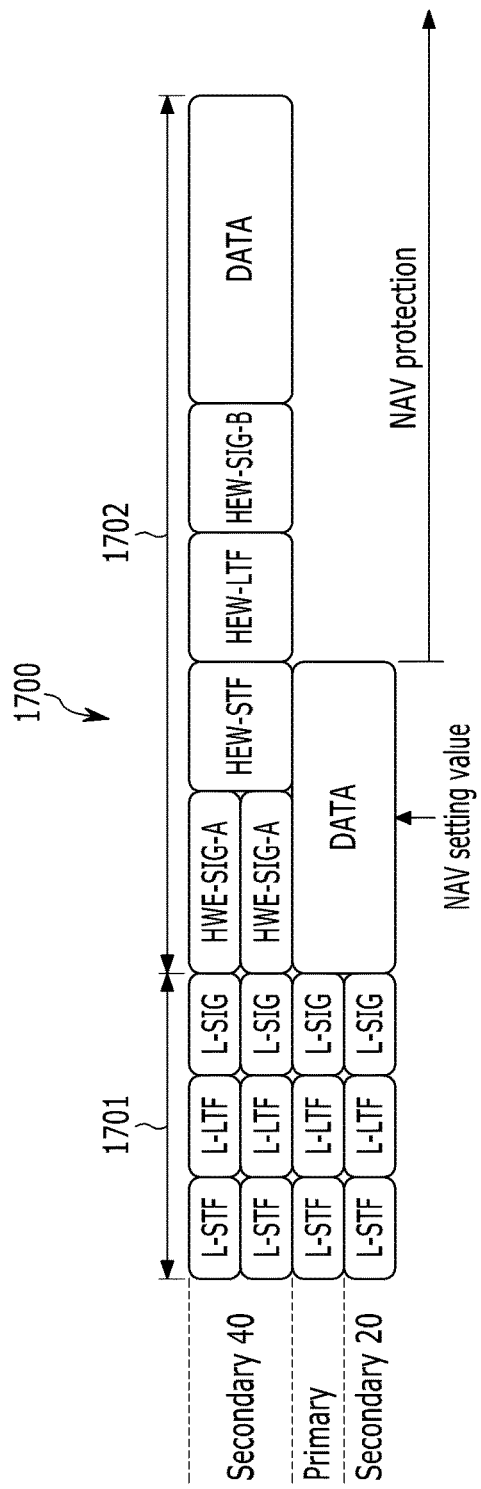
FIG. 17 and FIG. 18 each show a frame for a primary channel protection in a wireless communication network according to various embodiments of the present invention.
Figure 18:
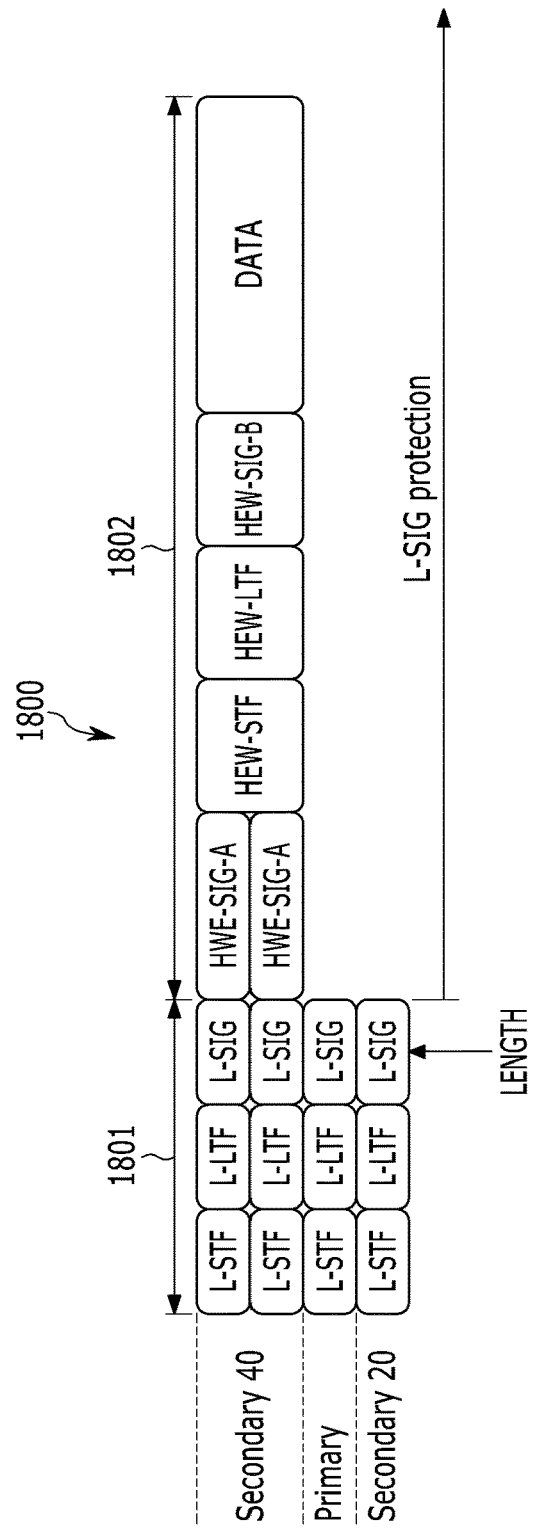
Figure 19:
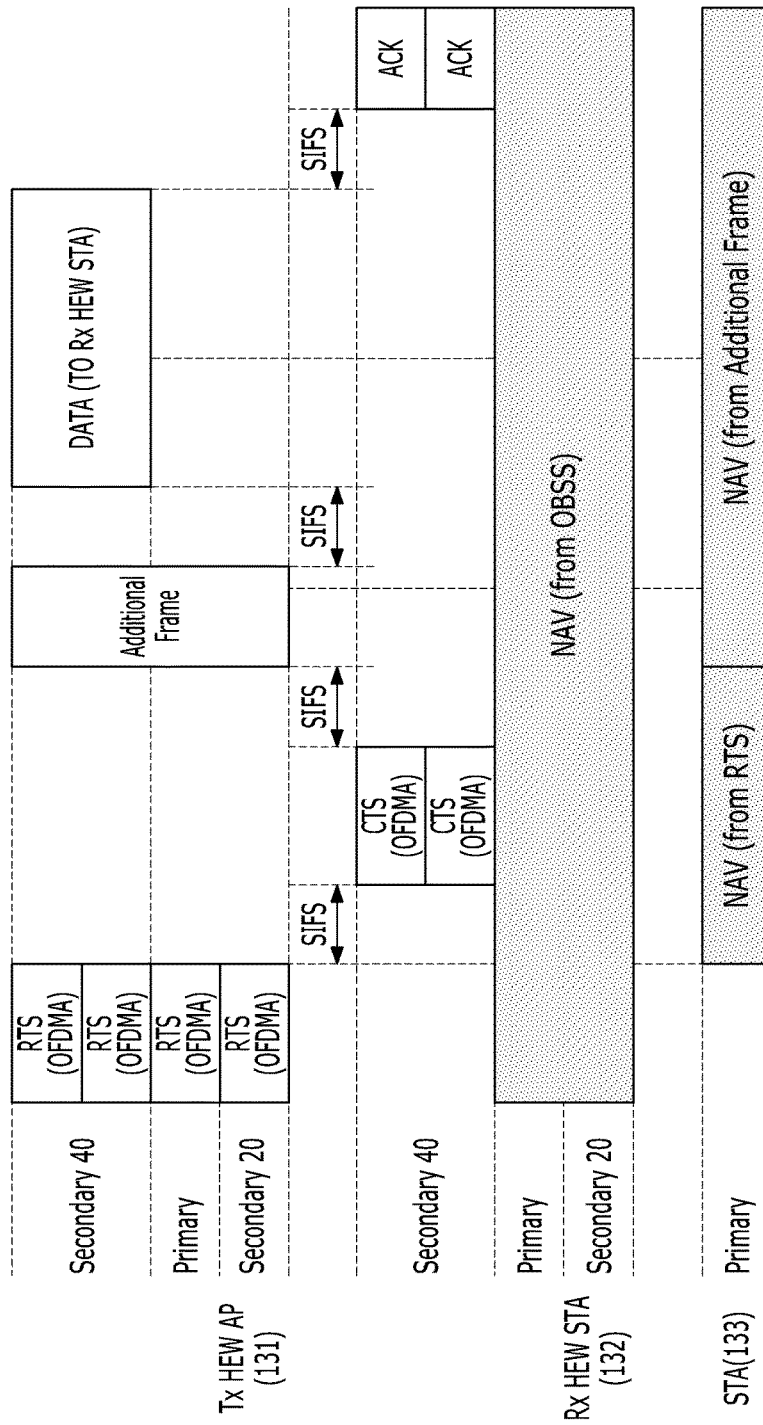

FIG. 15, FIG. 16, and FIG. 19 each show a primary channel protecting method in a wireless communication network according to various embodiments of the present invention, and FIG. 17 and FIG. 18 each show a frame for a primary channel protection in a wireless communication network according to various embodiments of the present invention.

As shown in FIG. 15 and FIG. 16, a transmitting HEW device, i.e., a HEW AP 131 controls a frame transmitted on a primary channel to prevent other device, i.e., a STA 133 from transmitting a frame on the primary channel.

In one embodiment, a frame that corresponds to the primary channel among frames transmitted by the transmitting HEW device may use a NAV protection including duration for a NAV setting. Then, as shown in FIG. 15, the other device may set a NAV based on the duration included in the frame.

In another embodiment, a legacy signal field protection (L-SIG protection) may be used based on a legacy signal field (L-SIG) of a frame that corresponds to the primary channel among frames transmitted by the transmitting HEW device may use a NAV protection including duration for a NAV setting. Then, as shown in FIG. 16, the other device does not transmit the frame on the primary channel during duration corresponding to a length indicated by the L-SIG.

In yet another embodiment, the NAV protection and the L-SIG protection may be simultaneously used.

As described above, a MAC frame is mapped to a data field of a PHY frame, for example a PLCP frame. A PHY frame which the transmitting HEW device uses for transmitting actual data to the receiving HEW device through the secondary channel and for the NAV protection or the L-SIG protection on the primary channel is described with reference to FIG. 17 and FIG. 18.

Referring to FIG. 17 and FIG. 18, when a secondary channel is independently used (for example, an OFDMA transmission is used, a frame 1700 or 1800, for example a PLCP frame is formed for each bandwidth. It is assumed in FIG. 17 and FIG. 18 that an 80 MHz channel width of a 20 MHz bandwidth unit is used and a transmitting HEW device transmits data to a receiving HEW device through a secondary 40 MHz channel.

The frame 1700 or 1800 includes a legacy signal part 1701 or 1801 for each bandwidth. The legacy signal part 1701 or 1801 a legacy short training field (L-STF), a legacy long training field (L-LTF), and a legacy signal field (L-SIG) for the backward compatibility with previous version WLAN devices. The L-STF and the L-LTF may be used for synchronization and channel estimation. The L-SIG may include rate and length information.

In a channel (the secondary 40 MHz channel in examples shown in FIG. 17 and FIG. 18) on which the actual data are transmitted, a HEW signal part 1702 or 1802 follows the legacy signal part 1701 or 1801. The HEW signal part 1702 or 1802 includes a HEW signal field (HEW-SIG-A) carrying signaling information for a HEW device. The HEW-SIG-A may be formed for each bandwidth. The HEW signal part 1702 or 1802 further includes a HEW preamble and a data field following the HEW-SIG-A. The HEW preamble may include a HEW short training field (HEW-STF) and a HEW long training field (HEW-LTF). The HEW-STF may be used for an automatic gain control of the HEW signal part 1702 or 1802, and the HEW-LTF may be used for channel estimation of the HEW signal part 1702 or 1802. A data frame to be transmitted to the receiving HEW device is mapped to the data field. The HEW signal part 1702 or 1802 may further include an additional HEW signal field (HEW-SIG-B) following the HEW preamble. The HEW-STF, the HEW-LTF, the HEW-SIG-B, and the data field may be formed by a bandwidth corresponding to the channel (a 40 MHz bandwidth corresponding to the secondary 40 MHz channel in examples shown in FIG. 17 and FIG. 18).

Referring to FIG. 17 again, in a channel (a primary channel and a secondary 20 MHz channel in an example shown in FIG. 17) on which the actual data are not transmitted, a data field is transmitted for the NAV protection after the legacy signal part 1701, in the same way as a legacy mode frame, i.e., a frame supported by the IEEE standard 802.11a or IEEE standard 802.11g. A MAC frame for the NAV setting is mapped to the data field. The transmitting HEW device may provide the NAV setting value through a duration/ID field of a MAC header in the MAC frame. The NAV setting value may have a value indicating duration for the NAV protection. For example, the duration for the NAV protection may be secondary channel transmission duration, i.e., duration in which a data frame and an ACK frame are transmitted. Accordingly, the other device can set the NAV based on the MAC frame mapped to the data field transmitted on the primary channel regardless of the WLAN version. Therefore, while the transmitting HEW device is transmitting the data to the receiving HEW device through the secondary channel, the other device cannot transmit the frame through the primary channel.

Referring to FIG. 18, in a channel (a primary channel and a secondary 20 MHz channel in an example shown in FIG. 19) on which the actual data are not transmitted, a length field of the L-SIG may have a value indicating duration for the L-SIG protection. For example, the duration for the L-SIG protection may be secondary channel transmission duration, i.e., duration in which a data frame and an ACK frame are transmitted. Accordingly, the other device can determine that the primary channel is used until the duration indicated by the length field of the L-SIG and cannot transmit the frame regardless of the WLAN version.

In yet another embodiment, the transmitting HEW device, i.e., the HEW AP 131 can protect the primary channel by using an additional frame. Referring to FIG. 19, the transmitting HEW device transmits an additional frame for the protection after receiving a response frame, for example a CTS frame, on an initiate frame from the receiving HEW device. The transmitting HEW device may transmit a data frame to the receiving HEW device after the SIFS interval has elapsed. The additional frame for the protection may be transmitted over an entire bandwidth or over a bandwidth including the primary channel.

The additional frame may include a NAV setting value for the NAV protection. The transmitting HEW device may provide the NAV setting value through a duration/ID field of a MAC header in a MAC frame. The NAV setting value may have a value indicating the duration for the NAV protection. For example, the duration for the NAV protection may be duration in which a data frame and an ACK frame are transmitted.

Alternatively, a length field of the L-SIG in the additional frame may indicate duration for the L-SIG protection. For example, the duration for the L-SIG protection may be duration in which a data frame and an ACK frame are transmitted.

Figure 20:
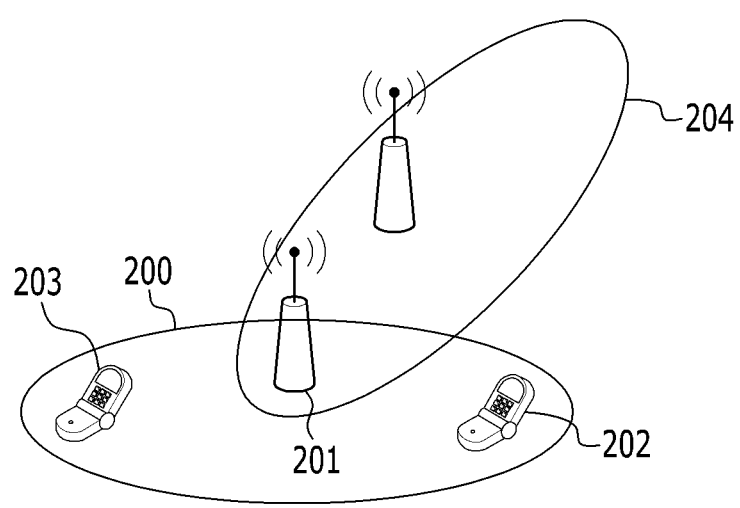
FIG. 20 shows another example of a wireless communication network in which a hidden device exists.
Figure 21:
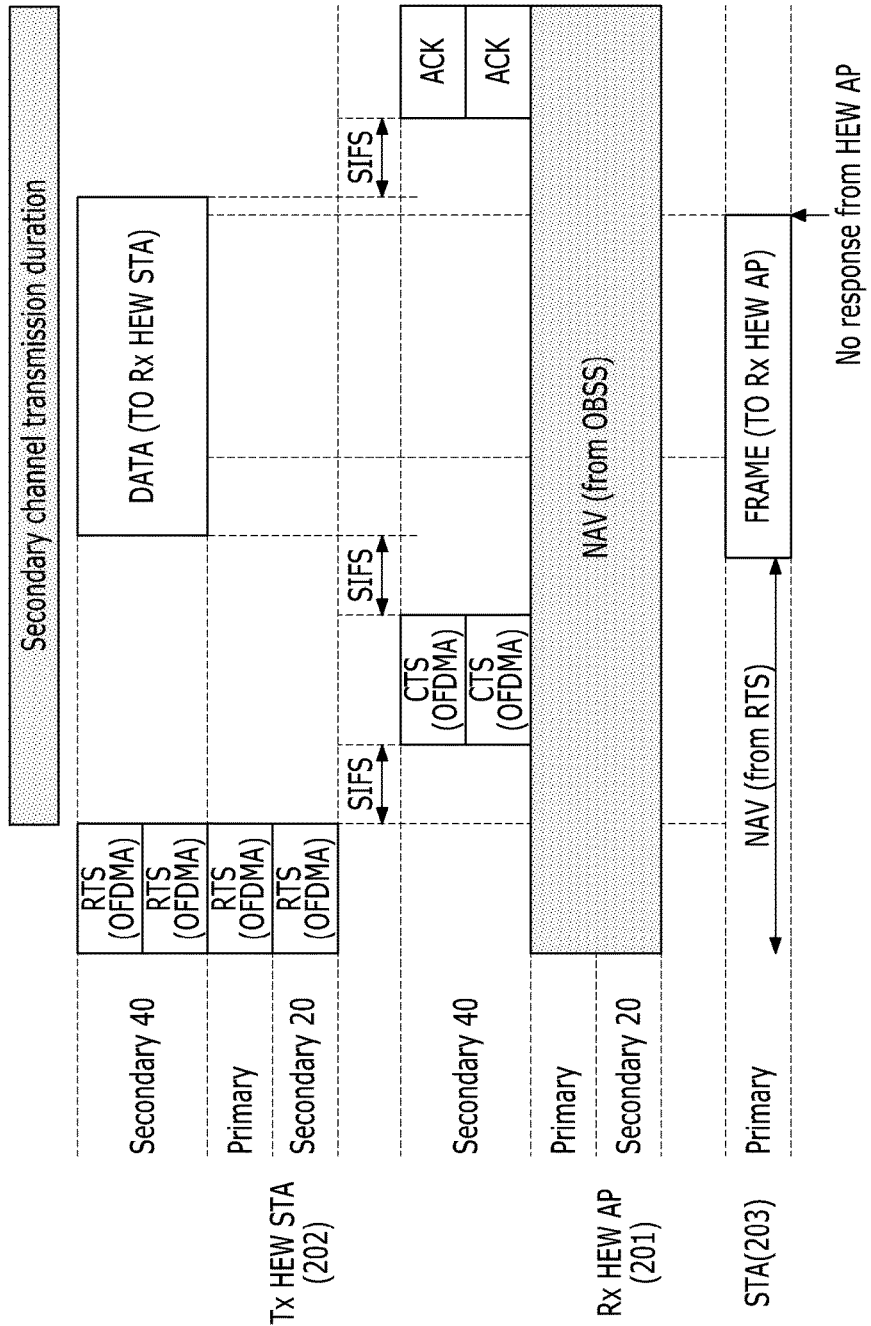
FIG. 21 and FIG. 22 each shows an operation example of a hidden device in a wireless communication network shown in FIG. 20.
Figure 22:
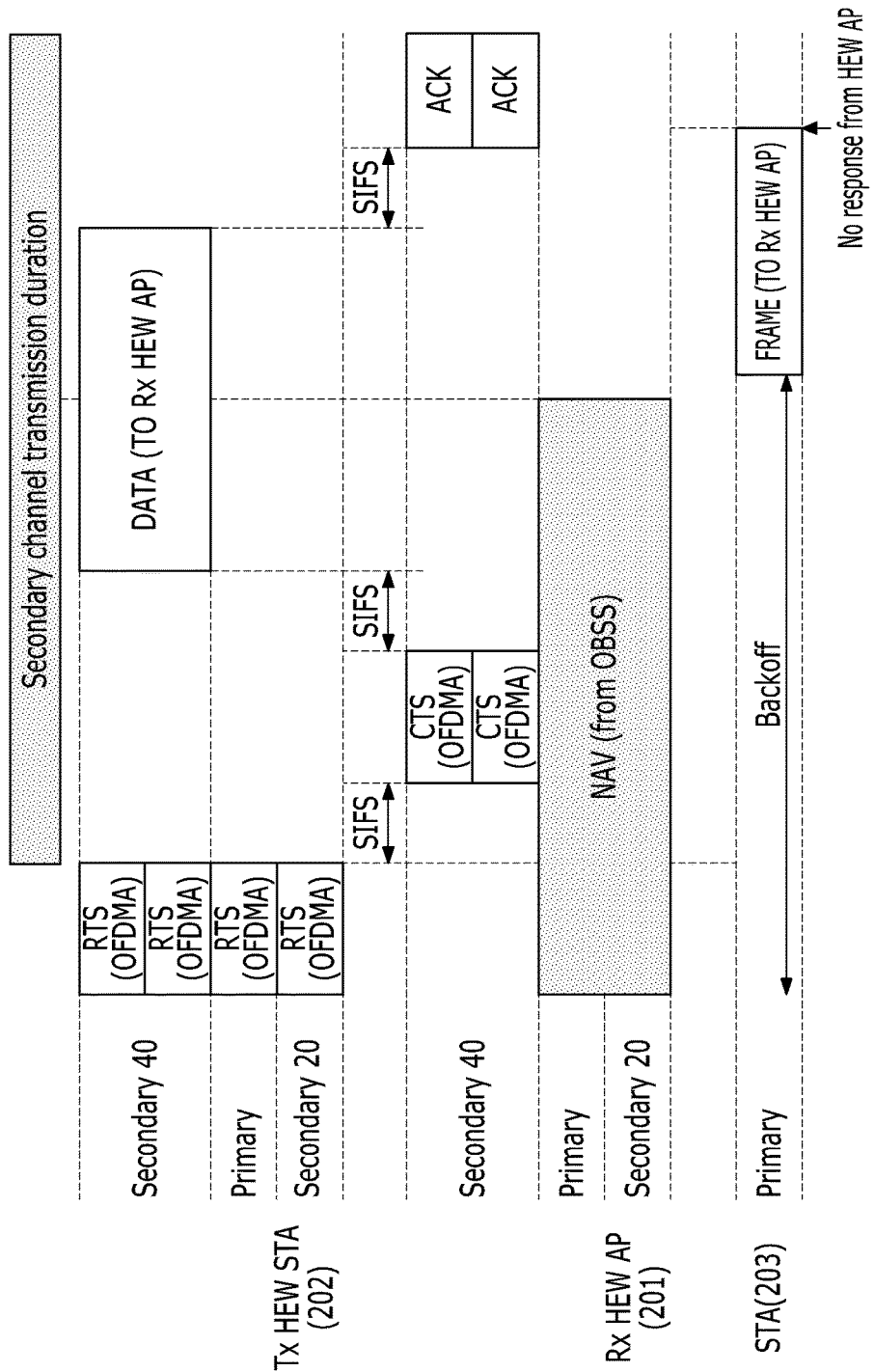

FIG. 20 shows another example of a wireless communication network in which a hidden device exists, and FIG. 21 and FIG. 22 each shows an operation example of a hidden device in a wireless communication network shown in FIG. 20. While FIG. 13 exemplifies a case that a HEW AP is a transmitting device, FIG. 20 exemplifies a case that a HEW AP 201 is a receiving device.

Referring to FIG. 20 and FIG. 21, in a case that a 40 MHz NAV is set by an OBSS 204, a HEW AP 201 may transmit a CTS frame to a HEW STA 202 on a secondary 40 MHz channel, and the HEW STA 202 may transmit an uplink data frame to the HEW AP 201 on the secondary 40 MHz channel. Other STA 203 that is hidden from the HEW STA 202 may exist within the BSS 130. Then, the other STA 133 cannot set a conventional NAV from an RTS frame since it is the STA hidden from the HEW STA 202. Further, the other STA 133 cannot set the conventional NAV from a CTS frame transmitted by the HEW AP 201 through the secondary channel since it cannot interpret the CTS frame. Accordingly, the other STA 203 may transmit a frame to the HEW AP 201 on the primary channel after the backoff. However, since the HEW AP 201 is receiving the data frame from the HEW STA 202, the HEW AP 201 may not transmit a response frame on the frame transmitted from the STA 203.

As shown in FIG. 21, when a bandwidth dependent NAV which the HEW AP 201, i.e., a receiving HEW device sets by the OBSS 204 is longer than secondary channel transmission duration of the HEW STA 202, i.e., a transmitting HEW device, the HEW AP 201 cannot transmit any frame on the primary channel during this duration regardless of a frame from the other STA 203. Accordingly, it is no problem that the HEW AP 201 cannot transmit the response frame on the frame from the other STA 203.

However, as shown in FIG. 22, when the bandwidth dependent NAV which the HEW AP 201 sets is shorter than the secondary channel transmission duration of the HEW STA 202, the HEW AP 201 may not transmit the response frame on the frame from the other STA 203 although the primary channel has not been occupied. Embodiments for solving this scenario are described with reference to FIG. 23 and FIG. 24.

Figure 23:
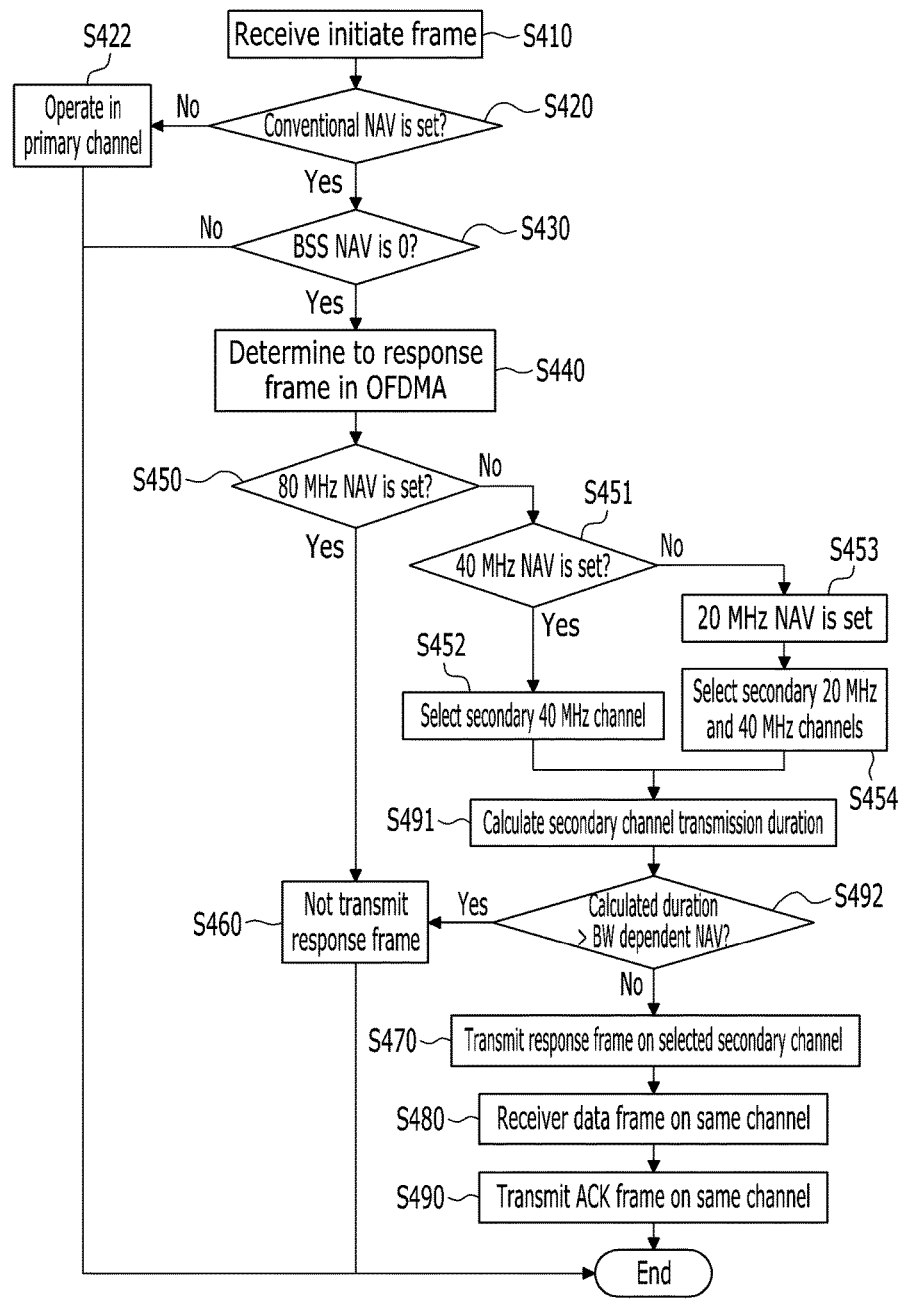
FIG. 23 is a flowchart exemplifying a transmission method in a wireless communication according to yet another embodiment of the present invention.
Figure 24:
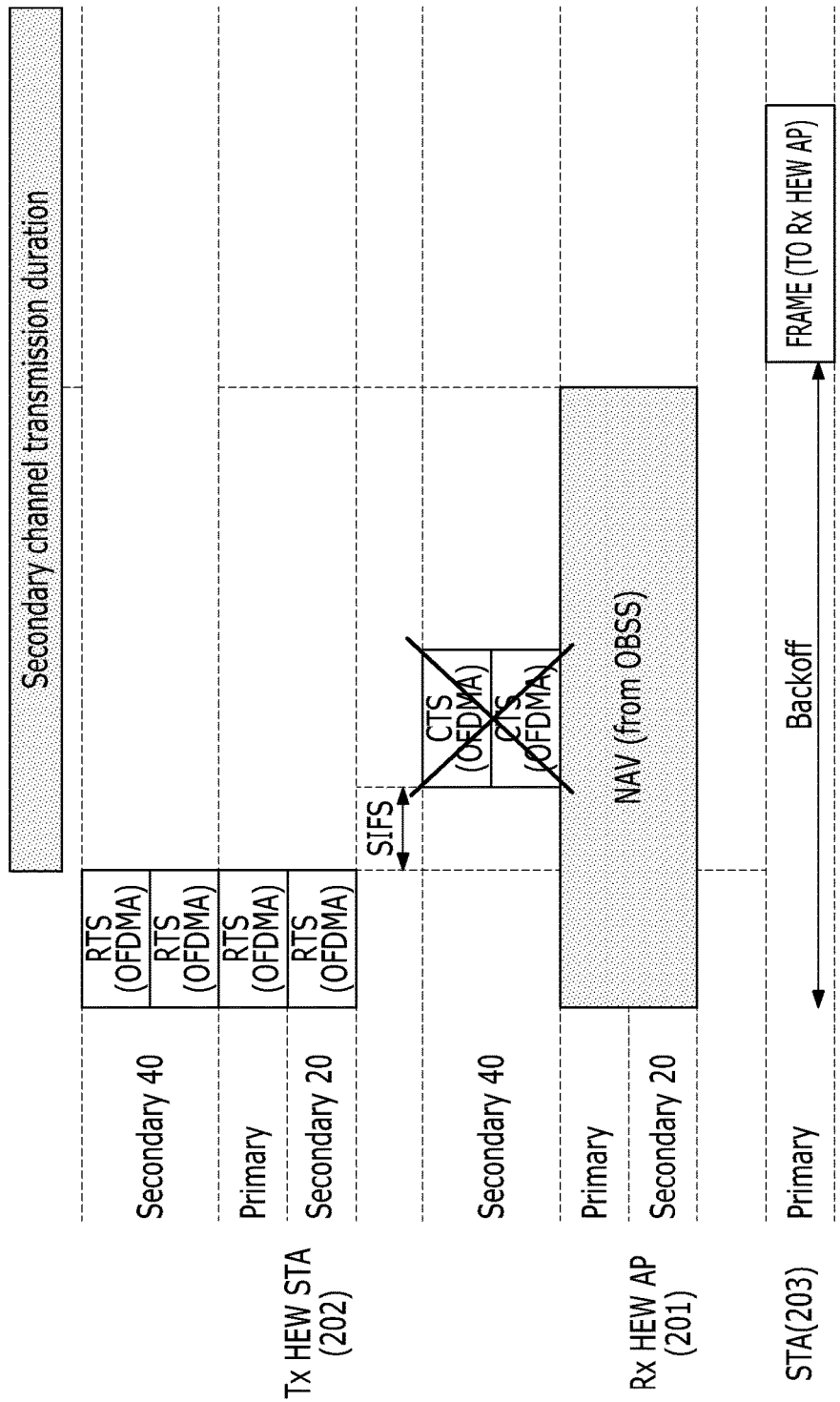
FIG. 24 shows an operation example of a device according to a transmission method shown in FIG. 23.

FIG. 23 is a flowchart exemplifying a transmission method in a wireless communication according to yet another embodiment of the present invention, and FIG. 24 shows an operation example of a device according to a transmission method shown in FIG. 23.

Referring to FIG. 23, as described with reference to FIG. 4, if a bandwidth dependent NAV has been set by an OBSS when a receiving HEW device, i.e., a HEW AP 201 receives a initiate frame (for example, an RTS frame) from a transmitting HEW device, i.e., a HEW STA 202, the receiving HEW device attempts to transmit a response frame (for example, a CTS frame) by using an OFDMA transmission (S410 to S440). The receiving HEW device selects a secondary channel in accordance with the bandwidth dependent NAV (S450 to S454). For example, as shown in FIG. 24, when a 40 MHz NAV is set, the receiving HEW device selects a secondary 40 MHz channel.

The receiving HEW device calculates duration that is needed to complete a transmission through the selected secondary channel (S491). If the calculated duration is shorter than the bandwidth dependent NAV that remains on the receiving HEW device (S492: No), the receiving HEW device transmits the response frame on the selected secondary channel (S470). That is, if a time when the receiving HEW device completes the transmission through the secondary channel is earlier than an expiring time of the bandwidth dependent NAV, the receiving HEW device transmits the response frame. If the calculated duration is longer than the bandwidth dependent NAV that remains on the receiving HEW device (S492: Yes), the receiving HEW device gives up transmitting the CTS frame as shown in FIG. 24 (S460).

As such, when the bandwidth dependent NAV set to the receiving HEW device is shorter than the secondary channel transmission duration, the receiving HEW device does not perform the transmission through the secondary channel, thereby allowing the other device to transmit the frame through the primary channel.

If the transmitting HEW device or receiving HEW device can communicate with other device through the primary channel while the transmitting HEW device and the receiving HEW device are communicating with each other through the secondary channel, the transmitting HEW device or receiving HEW device can transmit a response frame on a frame that is transmitted by the other device whose NAV has expired. To this end, according to another embodiment of the present invention, a HEW device includes a multi-modem. Hereinafter, embodiments using the multi-modem are described with reference to FIG. 25 to FIG. 30.

Figure 25:
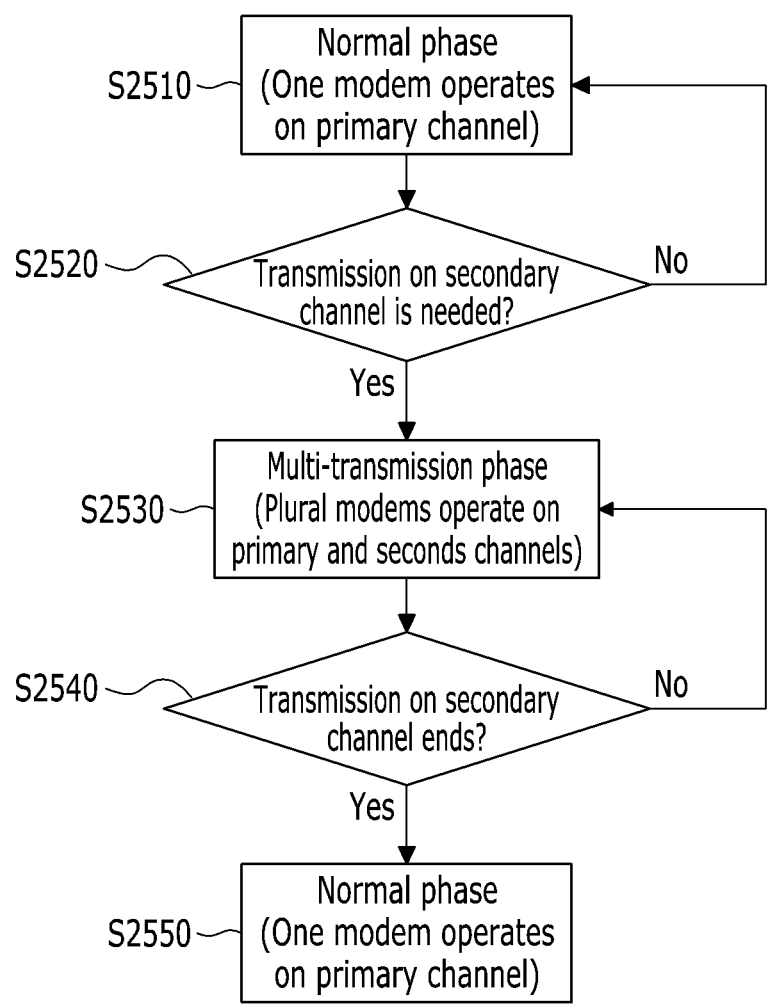
FIG. 25 is a flowchart exemplifying a multi-modem operation in a wireless communication network according to an embodiment of the present invention.
Figure 26:
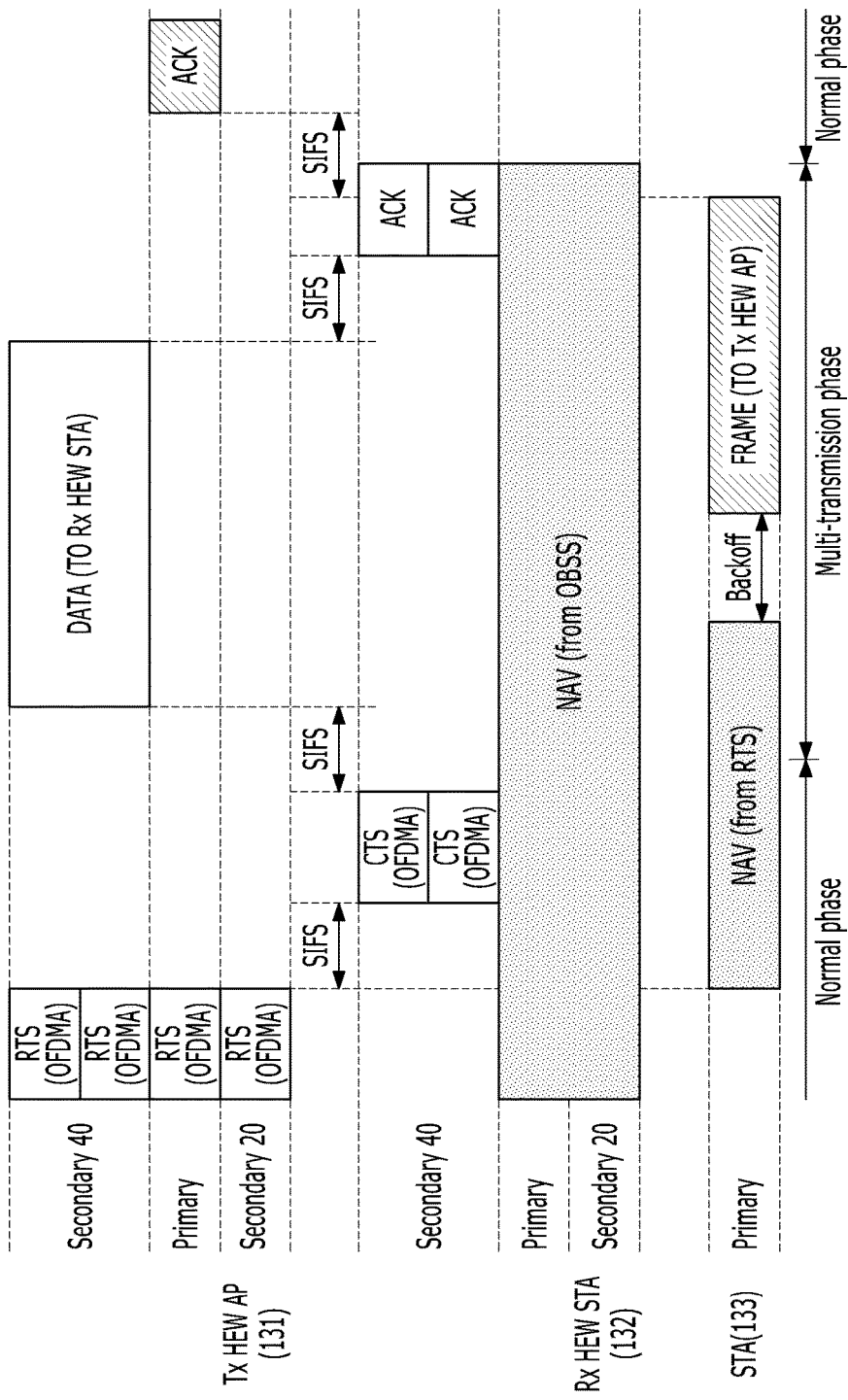
FIG. 26 and FIG. 27 each show a multi-modem operation in a wireless communication network according to an embodiment of the present invention.
Figure 27:
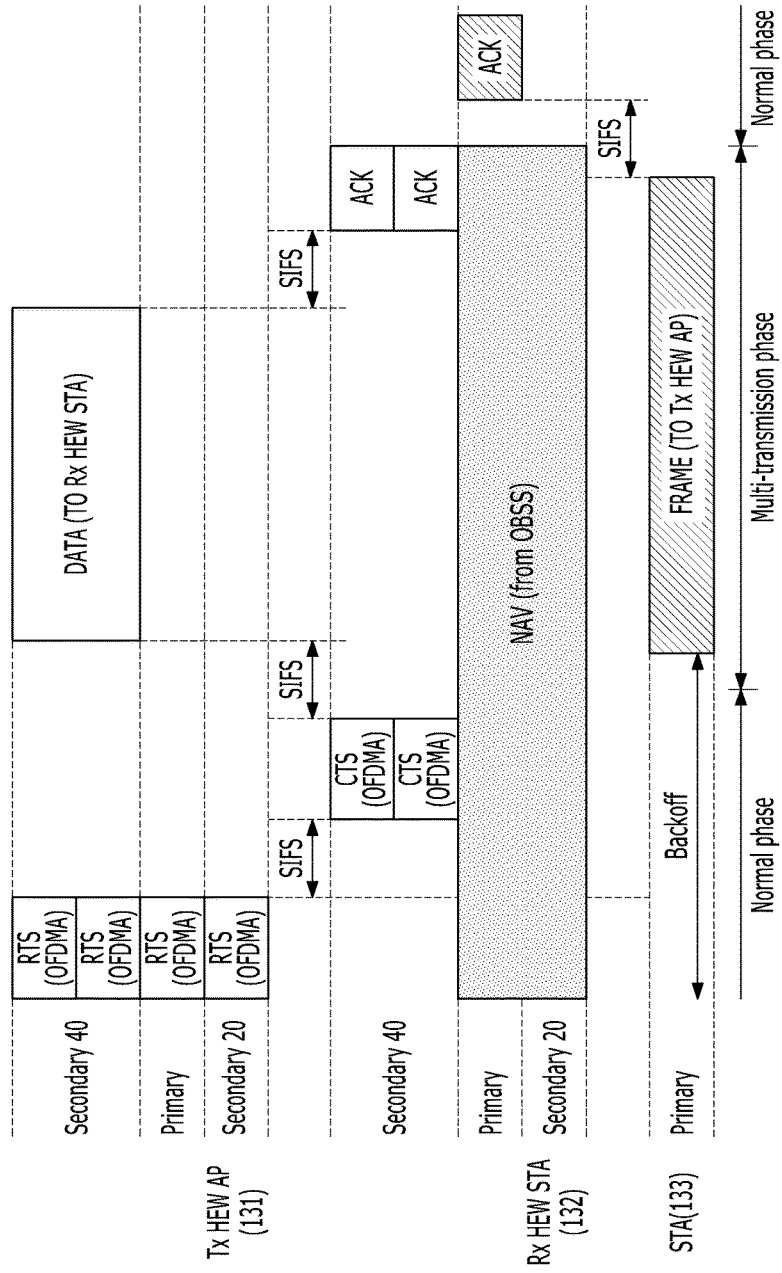

FIG. 25 is a flowchart exemplifying a multi-modem operation in a wireless communication network according to an embodiment of the present invention, and FIG. 26 and FIG. 27 each show a multi-modem operation in a wireless communication network according to an embodiment of the present invention.

Referring to FIG. 25, a HEW device operates in a normal phase when using a primary channel (S2510). In the normal phase, the HEW device may operate one modem in the multi-modem to transmit or receive a frame through the primary channel.

In the normal phase, the HEW device determines whether a communication using a secondary channel is needed (S2520). For example, when the HEW device receives an initiate frame (for example, an RTS frame) on the primary channel, the HEW device may select a secondary channel to transmit a response frame (for example, a CTS frame) because the bandwidth dependent NAV is set. In this case, HEW device may determine that the communication using the secondary channel is needed. Alternatively, when the HEW device receives the response frame on the secondary channel after transmitting the initiate frame on the primary channel, HEW device may determine that the communication using the secondary channel is needed.

When determining that the communication using the secondary channel is needed (S2520: Yes), the HEW device operates in a multi-transmission phase (S2530). In the multi-transmission phase, the HEW device may operate another modem in the multi-modem to transmit or receive a frame through the secondary channel. Upon determining that the communication using the secondary channel is not needed (S2520: No), the HEW device continuously operates in the normal phase.

If the transmission through the secondary channel ends (S2540: Yes), the HEW device operates in the normal phase again (S2550). That is, the HEW device terminates the operation of another modem and operates with one modem again. If the transmission continues through the secondary channel (S2540: No), the HEW device continuously operates in the multi-transmission phase (S2530).

Accordingly, in examples shown in FIG. 13 and FIG. 14, a HEW AP 131, i.e., a transmitting HEW device transmits an RTS frame to a HEW STA 132, i.e., a receiving HEW device in a normal phase, as shown in FIG. 26. When a 40 MHz NAV is set to the HEW STA 132 by an OBSS 134, the HEW STA 132 transmits a CTS frame to the HEW AP 131 on a secondary 40 MHz channel. The HEW AP 131 receiving the CTS frame determines that a transmission through the secondary channel (i.e., the secondary 40 MHz channel) is needed and switches to a multi-transmission phase. Accordingly, the HEW AP 131 transmits a data frame to the HEW STA 132 on the same channel as the CTS frame, and receives an ACK frame from the HEW STA 132 on the same channel. As such, while the transmission is being performed through the secondary channel, other STA 133 within the BSS 130 can transmit a frame to the HEW AP 131. The HEW AP 131 transmits a response frame to the STA 133 through a modem that additionally operates in the multi-transmission phase. After the transmission through the secondary channel ends (after receiving an ACK frame from the HEW STA 132 in an example shown in FIG. 26), the HEW AP 132 may switch to the normal phase to communicate with the other STA 133 with one modem.

In examples shown in FIG. 20 and FIG. 21, a HEW STA 202, i.e., a transmitting HEW device transmits an RTS frame to a HEW AP 201, i.e., a receiving HEW device in a normal phase, as shown in FIG. 27. When a 40 MHz NAV is set to the HEW AP 201 by an OBSS 204, the HEW AP 201 transmits a CTS frame to the HEW STA 202 on a secondary 40 MHz channel. The HEW STA 202 receiving the CTS frame determines that a transmission through the secondary channel (i.e., the secondary 40 MHz channel) is needed and switches to a multi-transmission phase. Accordingly, the HEW AP 201 receives a data frame from the HEW STA 202 on the same channel as the CTS frame, and transmits an ACK frame to the HEW STA 202 on the same channel. As such, while the transmission is being performed through the secondary channel, other STA 203 within the BSS 200 can transmit a frame to the HEW AP 201. The HEW AP 201 transmits a response frame to the STA 203 through a modem that additionally operates in the multi-transmission phase. After the transmission through the secondary channel ends (after transmitting an ACK frame to the HEW STA 202 in an example shown in FIG. 27), the HEW AP 202 may switch to the normal phase to communicate with the other STA 203 with one modem.

As such, the device can communicate with the other device while performing the transmission or reception through the secondary channel, by using the multi-modem.

It has been assumed in FIG. 2 and FIG. 3 that a primary 20 MHz channel and a secondary 20 MHz channel are used for a 40 MHz bandwidth, the primary 20 MHz channel, the secondary 20 MHz channel, and a secondary 40 MHz channel are used for an 80 MHz bandwidth, and the primary 20 MHz channel, the secondary 20 MHz channel, the secondary 40 MHz channel, and a secondary 80 MHz channel are used for a 160 MHz bandwidth, as defined in the IEEE standard 802.11ac.

However, when bands are independently used through a scheme such as the OFDMA transmission, bandwidths may be set differently from examples shown in FIG. 2 and FIG. 3.

Figure 28:
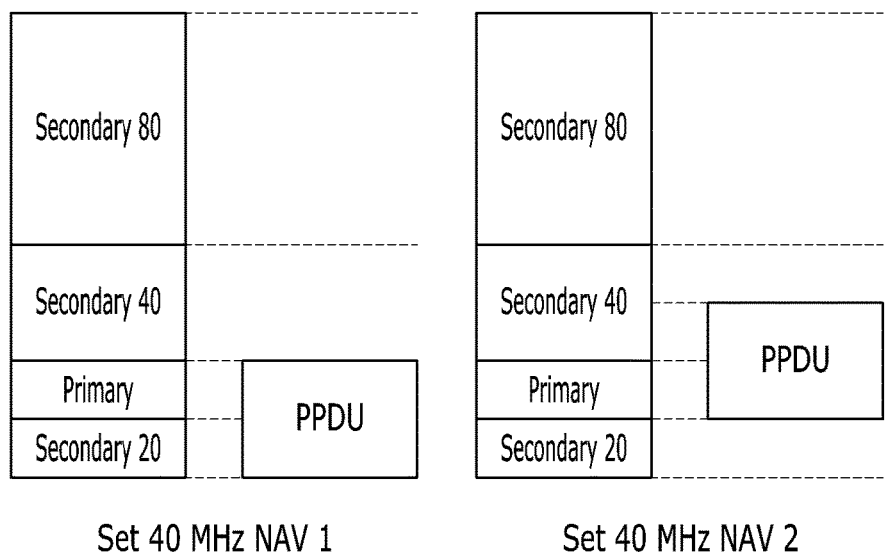
FIG. 28 and FIG. 29 each show an example of a bandwidth dependent NAV used in a wireless communication network according to another embodiment of the present invention.
Figure 29:
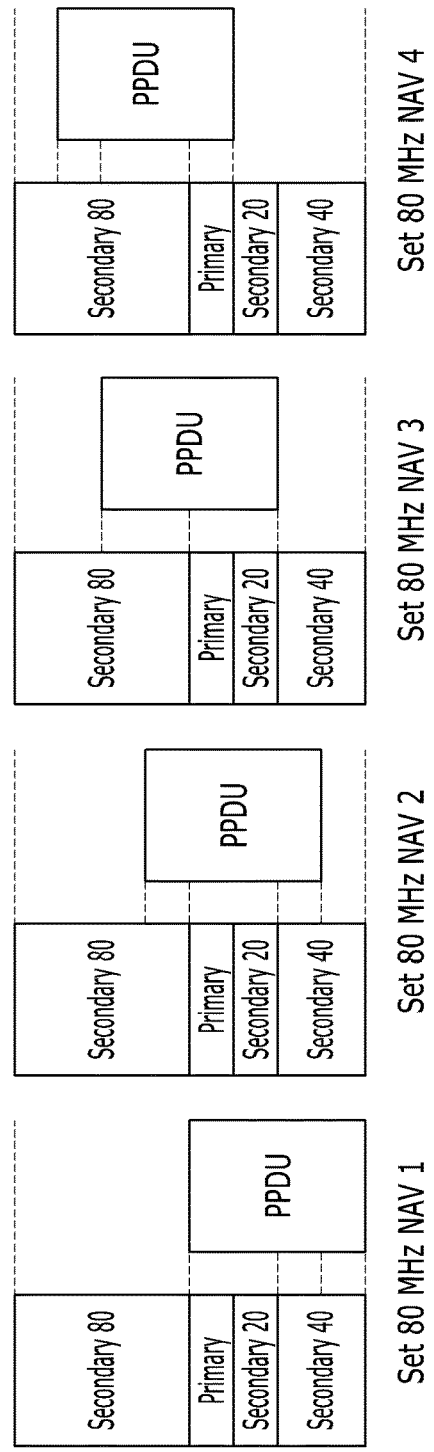

FIG. 28 and FIG. 29 each show an example of a bandwidth dependent NAV used in a wireless communication network according to another embodiment of the present invention.

Referring to FIG. 28, a primary channel and a secondary 20 MHz channel may be used for a 40 MHz bandwidth like the IEEE standard 802.11ac. Alternatively, the primary channel and a lower 20 MHz part of a secondary 40 MHz channel may be used for the 40 MHz bandwidth. Therefore, a HEW device may transmit a 40 MHz PPDU by selecting any one of two types in accordance with a channel state. Accordingly, a HEW device receiving the 40 MHz PPDU from an OBSS may set a bandwidth dependent NAV according to the type of the 40 MHz bandwidth. That is, when receiving the 40 MHz PPDU using the primary channel and the secondary 20 MHz channel, the HEW device may set a 40 MHz NAV on the primary channel and the secondary 20 MHz channel. When receiving the 40 MHz PPDU using the primary channel and the lower 20 MHz part of the secondary 40 MHz channel, the HEW device may set a 40 MHz NAV on the primary channel and the lower 20 MHz part of the secondary 40 MHz channel.

Referring to FIG. 29, any one type may be used for an 80 MHz bandwidth, among a type for using a primary channel, a secondary 20 MHz channel, and a secondary 40 MHz channel, a type for using the primary channel, the secondary 20 MHz channel, an upper 20 MHz part of the secondary 40 MHz channel, and a lower 20 MHz part of a secondary 80 MHz channel, a type for using the primary channel, the secondary 20 MHz channel, and a lower 40 MHz part of the secondary 80 MHz channel, and a type for using the primary channel and a lower 60 MHz part of the secondary 80 MHz channel. Therefore, a HEW device may transmit an 80 MHz PPDU by selecting any one of the four types in accordance with a channel state. Accordingly, a HEW device receiving the 80 MHz PPDU from an OBSS may set a bandwidth dependent NAV according to the type of the 80 MHz bandwidth.

While it has been described in above embodiments of the present invention that a channel of a 20 MHz bandwidth unit is used, a channel of a bandwidth unit narrower than 20 MHz or a channel of a bandwidth unit wider than 20 MHz may be used.

Next, a WLAN device according to an embodiment of the present invention is described with reference to FIG. 30 to FIG. 32.

Figure 30:
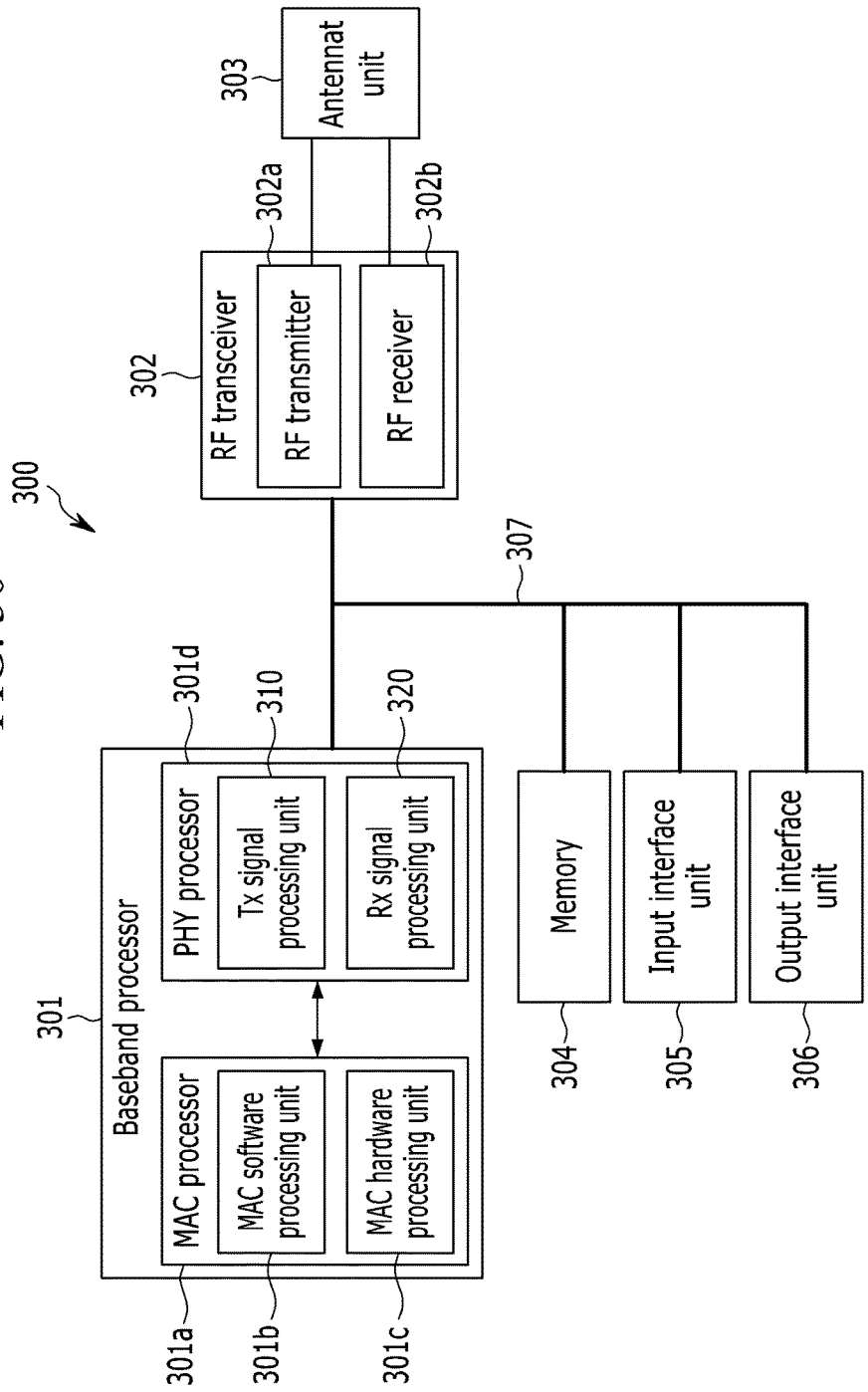
FIG. 30 is a schematic block diagram exemplifying a WLAN device according to an embodiment of the present invention.

FIG. 30 is a schematic block diagram exemplifying a WLAN device according to an embodiment of the present invention.

Referring to FIG. 30, the WLAN device 300 includes a baseband processor 301, a radio frequency (RF) transceiver 302, an antenna unit 303, a memory 304, an input interface unit 305, an output interface unit 306, and a bus 307.

The baseband processor 301 performs baseband signal processing, and includes a MAC processor 301*a* and a PHY processor 301*d*.

In one embodiment, the MAC processor 301*a* may include a MAC software processing unit 301*b* and a MAC hardware processing unit 301*c*. The memory 304 may store software (hereinafter referred to as "MAC software") including at least some functions of the MAC layer. The MAC software processing unit 301*b* executes the MAC software to implement the some functions of the MAC layer, and the MAC hardware processing unit 301*c* may implement remaining functions of the MAC layer as hardware (hereinafter referred to "MAC hardware"). However, the MAC processor 301*a* is not limited to this.

The PHY processor 301*d* includes a transmitting signal processing unit 310 and a receiving signal processing unit 320.

The baseband processor 301, the memory 304, the input interface unit 305, and the output interface unit 306 may communicate with each other via the bus 307.

The RF transceiver 302 includes an RF transmitter 302*a* and an RF receiver 302*b*.

The memory 304 may further store an operating system and applications. The input interface unit 305 receives information from a user, and the output interface unit 306 outputs information to the user.

The antenna unit 303 includes an antenna. When multiple-input multiple-output (MIMO) or multi-user MIMO (MU-MIMO) is used, the antenna unit 303 may include a plurality of antennas.

A transmission method according above embodiments of the present invention may be implemented by the MAC processor 301*a* and/or the PHY processor 321*d*.

Figure 31:
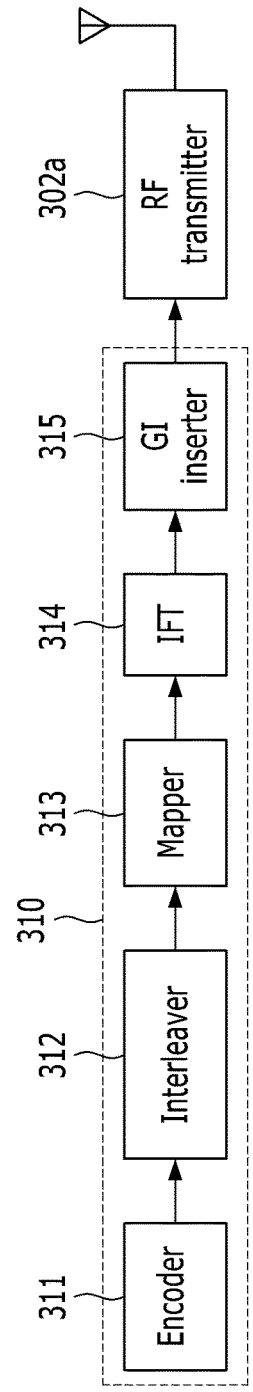
FIG. 31 is a schematic block diagram exemplifying a transmitting signal processing unit of a WLAN device according to an embodiment of the present invention.

FIG. 31 is a schematic block diagram exemplifying a transmitting signal processing unit of a WLAN device according to an embodiment of the present invention.

Referring to FIG. 31, a transmitting signal processing unit 310 includes an encoder 311, an interleaver 312, a mapper 313, an inverse Fourier transformer (IFT) 314, and a guard interval (GI) inserter 315.

The encoder 311 encodes input data. For example, the encoder 311 may be a forward error correction (FEC) encoder. The FEC encoder may include a binary convolutional code (BCC) encoder followed by a puncturing device, or may include a low-density parity-check (LDPC) encoder.

The transmitting signal processing unit 310 may further include a scrambler for scrambling the input data before the encoding to reduce the probability of long sequences of 0s or 1s. If BCC encoding is used in the encoder, the transmitting signal processing unit 310 may further include an encoder parser for demultiplexing the scrambled bits among a plurality of BCC encoders. If LDPC encoding is used in the encoder, the transmitting signal processing unit 310 may not use the encoder parser.

The interleaver 312 interleaves the bits of each stream output from the encoder to change order of bits. Interleaving may be applied only when BCC encoding is used. The mapper 313 maps the sequence of bits output from the interleaver to constellation points. If the LDPC encoding is used in the encoder, the mapper 313 may further perform LDPC tone mapping besides the constellation mapping.

When the MIMO or the MU-MIMO is used, the transmitting signal processing unit 310 may use a plurality of interleavers 312 and a plurality of mappers 313 corresponding to the number of $N_{SS}$ of spatial streams. In this case, the transmitting signal processing unit 310 may further include a stream parser for dividing outputs of the BCC encoders or the LDPC encoder into blocks that are sent to different interleavers 312 or mappers 313. The transmitting signal processing unit 310 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 314 converts a block of the constellation points output from the mapper 313 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 310 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 315 prepends a GI to the symbol. The transmitting signal processing unit 310 may optionally perform windowing to smooth edges of each symbol after inserting the GI. The RF transmitter (302*a* of FIG. 30) converts the symbols into an RF signal and transmits the RF signal via the antenna. When the MIMO or the MU-MIMO is used, the GI inserter 315 and the RF transmitter 302*a* may be provided for each transmit chain.

Figure 32:
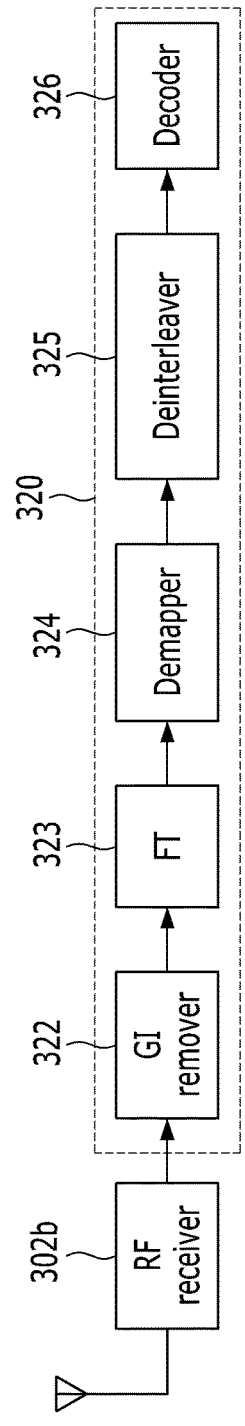
FIG. 32 is a schematic block diagram exemplifying a receiving signal processing unit in a WLAN device according to an embodiment of the present invention.

FIG. 32 is a schematic block diagram exemplifying a receiving signal processing unit in a WLAN device according to an embodiment of the present invention.

Referring to FIG. 32, a receiving signal processing unit 320 includes a GI remover 322, a Fourier transformer (FT) 323, a demapper 324, a deinterleaver 325, and a decoder 326.

An RF receiver (302*b* of FIG. 30) receives an RF signal via the antenna unit 303 and converts the RF signal into the symbols. The GI remover 322 removes the GI from the symbol. When the MIMO or the MU-MIMO is used, the RF receiver 302*b* and the GI remover 322 may be provided for each receive chain.

The FT 323 converts the symbol (i.e., the time domain block) into a block of the constellation points by using a discrete Fourier transform (DFT) or a fast Fourier transform (FFT). The FT 323 may be provided for each receive chain.

When the MIMO or the MU-MIMO is used, the receiving signal processing unit 320 may a spatial demapper for converting the Fourier transformed receiver chains to constellation points of the space-time streams, and an STBC decoder for despreading the constellation points from the space-time streams into the spatial streams.

The demapper 324 demaps the constellation points output from the FT 323 or the STBC decoder to the bit streams. If the LDPC encoding is used, the demapper 324 may further perform LDPC tone demapping before the constellation demapping. The deinterleaver 325 deinterleaves the bits of each stream output from the demapper 324. Deinterleaving may be applied only when BCC encoding is used.

When the MIMO or the MU-MIMO is used, the receiving signal processing unit 320 may use a plurality of demappers 324 and a plurality of deinterleavers 325 corresponding to the number of spatial streams. In this case, the receiving signal processing unit 320 may further include a stream deparser for combining the streams output from the deinterleavers 325.

The decoder 326 decodes the streams output from the deinterleaver 325 or the stream deparser. For example, the decoder 326 may be an FEC decoder. The FEC decoder may include a BCC decoder or an LDPC decoder. The receiving signal processing unit 320 may further include a descrambler for descrambling the decoded data. If BCC decoding is used in the decoder, the receiving signal processing unit 320 may further include an encoder deparser for multiplexing the data decoded by a plurality of BCC decoders. If LDPC decoding is used in the decoder, the receiving signal processing unit 320 may not use the encoder deparser.

Figure 33:
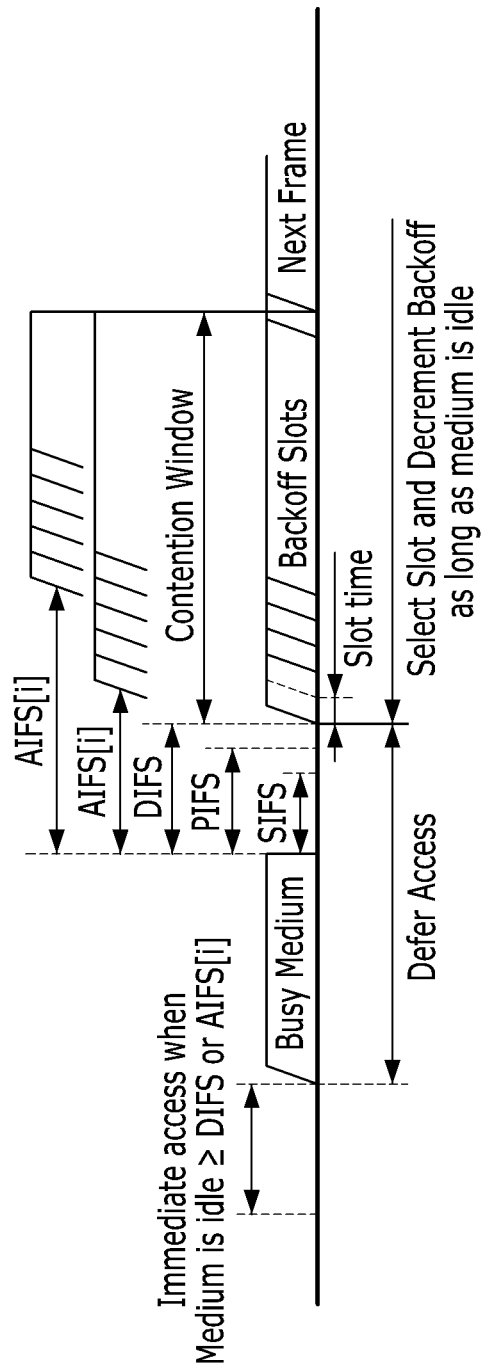
FIG. 33 exemplifies interframe space (IFS) relationships.

FIG. 33 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 34:
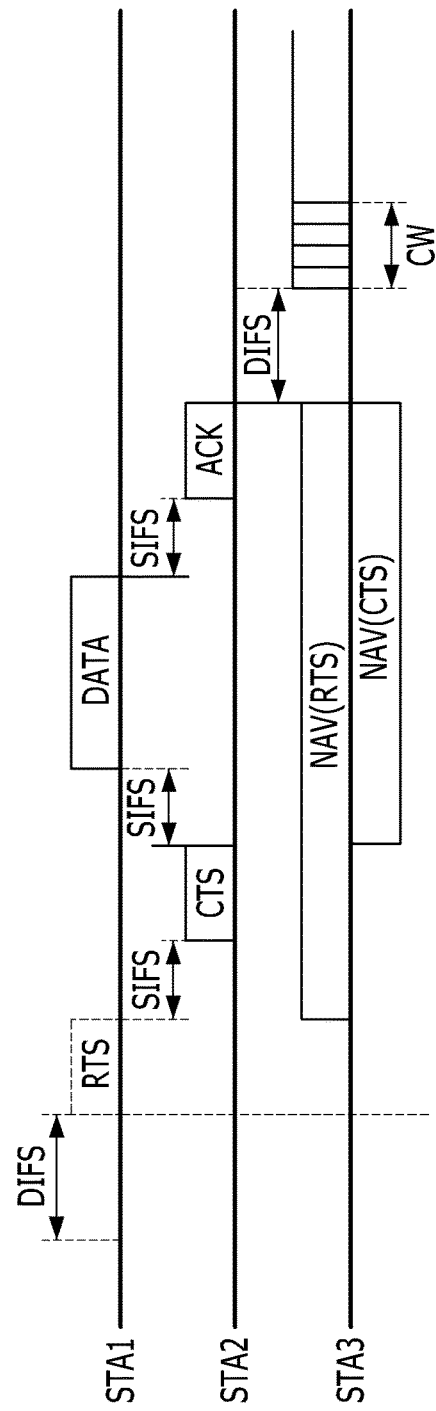
FIG. 34 is a schematic diagram explaining a CSMA/CA based frame transmission procedure for avoiding collision between frames in a channel.

FIG. 34 is a schematic diagram explaining a CSMA (carrier sense multiple access)/CA (collision avoidance) based frame transmission procedure for avoiding collision between frames in a channel.

Referring to FIG. 34, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A wireless communication device in a wireless local area network (WLAN), the wireless communication device comprising:
   a hardware processor; and
   one or more memory devices coupled to the hardware processor, wherein the one or more memory devices include one or more instructions, which when executed by the hardware processor cause the wireless communication device to:
   receive, from an access point, an initiate frame to initiate an uplink multi-user transmission;
   acquire information associated with a required duration for transmission completion of a response frame for the initiate frame;
   receive a signal;
   determine a Basic Service Set (BSS) from which the signal was received;
   update a conventional Network Allocation Vector (NAV) based on the signal in response to determining that the BSS from which the signal was received is an Overlapping BSS;
   determine a permissibility of transmission of the response frame for the initiate frame in the uplink multi-user transmission, based on the conventional NAV and the acquired information; and
   transmit the response frame to the access point in the uplink multi-user transmission, responsive to a determination that transmission of the response frame for the initiate frame in the uplink multi-user transmission is permissible.

2. The wireless communication device of claim 1, wherein the acquired information represents whether the wireless communication device is to transmit an acknowledgement frame whose required duration for transmission completion is not larger than a predetermined value or other frame than the acknowledgement frame whose required duration for transmission completion is not larger than the predetermined value.

3. The wireless communication device of claim 1, wherein the one or more instructions further cause the wireless communication device to acquire a counter of the conventional NAV, and wherein determining the permissibility based on the conventional NAV and the acquired information comprises:
   determining the permissibility based on the counter of the conventional NAV and the acquired information.

4. The wireless communication device of claim 3, wherein determining the permissibility based on the counter of the conventional NAV and the acquired information comprises:
   when the acquired information represents that the wireless communication device is to transmit the other frame than the acknowledgement frame whose required duration for transmission completion is not larger than the predetermined value and the counter of the conventional NAV is non-zero, determining that transmission of the response frame in the uplink multi-user transmission is impermissible.

5. The wireless communication device of claim 3, wherein determining the permissibility based on the counter of the conventional NAV and the acquired information further comprises:

when the acquired information represents that the wireless communication device is to transmit the other frame than the acknowledgement frame whose required duration for transmission completion is not larger than the predetermined value and the counter of the conventional NAV is zero, determining that transmission of the response frame in the uplink multi-user transmission is permissible.

6. The wireless communication device of claim 3, wherein determining the permissibility based on the counter of the conventional NAV and the acquired information further comprises:
when the acquired information represents that the wireless communication device is to transmit the acknowledgement frame whose required duration for transmission completion is not larger than the predetermined value, determining that transmission of the response frame in the uplink multi-user transmission is permissible.

7. The method of claim 1, wherein transmitting the response frame comprises:
transmitting the response frame a short inter-frame space (SIFS) after the initiate frame is received.

8. The method of claim 1, wherein transmitting the response frame comprises:
transmitting the response frame on a subchannel that is occupied by the initiate frame.

9. A method implemented by a wireless communication device in a wireless local area network (WLAN), the method comprising:
receiving a signal;
determining a Basic Service Set (BSS) from which the signal was received;
updating a conventional Network Allocation Vector (NAV) based on the signal in response to determining that the BSS from which the signal was received is an Overlapping BSS;
receiving, from an access point, an initiate frame to initiate an uplink multi-user transmission;
acquiring information representing whether the wireless communication device is to transmit an acknowledgement frame whose required duration for transmission completion is not larger than a predetermined value or other frame than the acknowledgement frame whose required duration for transmission completion is not larger than the predetermined value;
determining a permissibility of transmission of a response frame for the initiate frame in the uplink multi-user transmission, based on the conventional NAV and the acquired information representing whether the wireless communication device is to transmit the acknowledgement frame whose required duration for transmission completion is not larger than the predetermined value or the other frame than the acknowledgement frame whose required duration for transmission completion is not larger than the predetermined value; and
responsive to a determination that transmission of the response frame for the initiate frame in the uplink multi-user transmission is permissible, transmitting the response frame to the access point in the uplink multi-user transmission.

10. The method of claim 9, further comprising:
acquiring a counter of the conventional NAV,
wherein determining the permissibility based on the conventional NAV and the acquired information comprises:
determining the permissibility based on the counter of the conventional NAV and the acquired information.

11. The method of claim 10, wherein determining the permissibility based on the counter of the conventional NAV and the acquired information comprises:
when the acquired information represents that the wireless communication device is to transmit the other frame than the acknowledgement frame whose required duration for transmission completion is not larger than the predetermined value and the counter of the conventional NAV is non-zero, determining that transmission of the response frame in the uplink multi-user transmission is impermissible.

12. The method of claim 10, wherein determining the permissibility based on the counter of the conventional NAV and the acquired information further comprises:
when the acquired information represents that the wireless communication device is to transmit the other frame than the acknowledgement frame whose required duration for transmission completion is not larger than the predetermined value and the counter of the conventional NAV is zero, determining that transmission of the response frame in the uplink multi-user transmission is permissible.

13. The method of claim 10, wherein determining the permissibility based on the counter of the conventional NAV and the acquired information further comprises:
when the acquired information represents that the wireless communication device is to transmit the acknowledgement frame whose required duration for transmission completion is not larger than the predetermined value, determining that transmission of the response frame in the uplink multi-user transmission is permissible.

14. A method implemented by a wireless communication device in a wireless local area network (WLAN), the method comprising:
receiving a signal;
determining a Basic Service Set (BSS) from which the signal was received;
updating a conventional Network Allocation Vector (NAV) based on the signal in response to determining that the BSS from which the signal was received is an Overlapping BSS;
receiving, from an access point, an initiate frame to initiate an uplink multi-user transmission;
acquiring information representing whether the wireless communication device is to transmit an acknowledgement frame whose required duration for transmission completion is not larger than a predetermined value or other frame than the acknowledgement frame whose required duration for transmission completion is not larger than the predetermined value;
acquiring a counter of the conventional NAV;
when the acquired information represents that the wireless communication device is to transmit the other frame than the acknowledgement frame whose required duration for transmission completion is not larger than the predetermined value and a counter of the conventional NAV is non-zero, determining that transmission of a response frame for the initiate frame in the uplink multi-user transmission is impermissible; and
when the acquired information represents that the wireless communication device is to transmit the other frame than the acknowledgement frame whose required duration for transmission completion is not larger than the predetermined value and the counter of the conventional NAV is zero, determining that transmission of the response frame for the initiate frame in the uplink multi-user transmission is permissible.

15. The method of claim 14, further comprising:
responsive to a determination that transmission of the response frame for the initiate frame in the uplink multi-user transmission is permissible, transmitting the response frame to the access point in the uplink multi-user transmission.

16. The method of claim 14, further comprising:
when the acquired information represents that the wireless communication device is to transmit the acknowledgement frame whose required duration for transmission completion is not larger than the predetermined value, determining that transmission of the acknowledgement frame in the uplink multi-user transmission is permissible.

* * * * *